US012694835B2

(12) United States Patent
Kim et al.

(10) Patent No.: US 12,694,835 B2
(45) Date of Patent: Jul. 28, 2026

(54) ORGANIC LIGHT EMITTING DISPLAY DEVICE

(71) Applicant: SAMSUNG DISPLAY CO., LTD., Yongin-si (KR)

(72) Inventors: Yong Jae Kim, Yongin-si (KR); Jin Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 254 days.

(21) Appl. No.: 18/369,937

(22) Filed: Sep. 19, 2023

(65) Prior Publication Data

US 2024/0005874 A1 Jan. 4, 2024

Related U.S. Application Data

(63) Continuation of application No. 17/891,455, filed on Aug. 19, 2022, now Pat. No. 11,783,781, which is a (Continued)

(30) Foreign Application Priority Data

Sep. 22, 2017 (KR) ........................ 10-2017-0122539

(51) Int. Cl.
*G09G 3/3266* (2016.01)
*G09G 3/3233* (2016.01)
(Continued)

(52) U.S. Cl.
CPC ......... *G09G 3/3266* (2013.01); *G09G 3/3233* (2013.01); *G09G 3/3275* (2013.01);
(Continued)

(58) Field of Classification Search
CPC .. G09G 3/3266; G09G 3/3233; G09G 3/3275; G09G 3/3291; G09G 2300/0809;
(Continued)

(56) References Cited

U.S. PATENT DOCUMENTS 4,720,707 A 1/1988 Konishi et al.
6,278,418 B1 8/2001 Doi
(Continued)

FOREIGN PATENT DOCUMENTS

CN 101034532 A 9/2007
CN 101496089 A 7/2009
(Continued)

OTHER PUBLICATIONS

Chinese Office Action for Application No. 201811105148.6 dated Aug. 5, 2022, citing the above reference(s).

*Primary Examiner* — Prabodh M Dharia
(74) *Attorney, Agent, or Firm* — CANTOR COLBURN LLP

(57) ABSTRACT

In an organic light emitting display device which displays an image in a first mode or a second mode, the organic light emitting display device includes: a first scan driver which supplies a first scan signal having a first voltage to first scan lines; a second scan driver which supplies a second scan signal having a second voltage larger than the first voltage to second scan lines; and a pixel unit including pixels each coupled to a corresponding first scan line and a corresponding second scan line. When a first image displayed in the second mode is changed to a second image to be displayed in the second mode, the second image is displayed in the first mode during a predetermined portion of a period, in which the second image is displayed, and is displayed in the second mode during the remaining portion of the period.

13 Claims, 19 Drawing Sheets

Related U.S. Application Data continuation of application No. 17/113,723, filed on Dec. 7, 2020, now Pat. No. 11,450,280, which is a continuation of application No. 16/039,524, filed on Jul. 19, 2018, now Pat. No. 10,861,393.

(51) Int. Cl.
*G09G 3/3275* (2016.01)
*G09G 3/3291* (2016.01)

(52) U.S. Cl.
CPC ... *G09G 3/3291* (2013.01); *G09G 2300/0809* (2013.01); *G09G 2300/0819* (2013.01); *G09G 2300/0842* (2013.01); *G09G 2300/0861* (2013.01); *G09G 2310/0251* (2013.01); *G09G 2310/0262* (2013.01); *G09G 2310/06* (2013.01); *G09G 2310/08* (2013.01); *G09G 2340/0435* (2013.01)

(58) Field of Classification Search
CPC ... G09G 2300/0819; G09G 2300/0842; G09G 2300/0861; G09G 2310/0251; G09G 2310/0262; G09G 2310/06; G09G 2310/08; G09G 2340/0435; G09G 2330/021; G09G 2230/00; H10D 30/6743; H10D 30/6755
USPC ................................ 345/208, 76, 77, 82, 92
See application file for complete search history.

(56) References Cited

U.S. PATENT DOCUMENTS

| | | | | |
|---|---|---|---|---|
| 7,187,351 | B2 * | 3/2007 | Kwon | G09G 3/325 345/82 |
| 8,692,822 | B2 | 4/2014 | Yanagi et al. | |
| 8,698,854 | B2 | 4/2014 | Lee | |
| 8,805,157 | B2 | 8/2014 | Yoshida | |
| 8,878,751 | B2 | 11/2014 | Chung et al. | |
| 8,896,504 | B2 | 11/2014 | Park et al. | |
| 9,165,518 | B2 | 10/2015 | Choi et al. | |
| 9,412,303 | B2 | 8/2016 | Kim et al. | |
| 9,818,344 | B2 | 11/2017 | Lin et al. | |
| 9,818,375 | B2 | 11/2017 | Sone et al. | |
| 9,823,729 | B2 | 11/2017 | An et al. | |
| 9,824,651 | B2 | 11/2017 | Umekida et al. | |
| 9,966,007 | B2 | 5/2018 | Cho et al. | |
| 10,127,848 | B2 | 11/2018 | Kang | |
| 10,186,199 | B2 | 1/2019 | Jeon | |
| 10,861,393 | B2 | 12/2020 | Kim et al. | |
| 12,008,947 | B2 * | 6/2024 | Shin | G09G 3/22 |
| 2002/0093473 | A1 | 7/2002 | Tanaka et al. | |
| 2003/0103022 | A1 | 6/2003 | Noguchi et al. | |
| 2004/0150595 | A1 | 8/2004 | Kasai | |
| 2004/0207615 | A1 | 10/2004 | Yumoto | |
| 2005/0140602 | A1 * | 6/2005 | Shin | G09G 3/3241 345/76 |
| 2008/0106542 | A1 | 5/2008 | Park et al. | |
| 2008/0284719 | A1 | 11/2008 | Yoshida | |
| 2009/0115707 | A1 * | 5/2009 | Park | G09G 3/3291 345/76 |
| 2009/0252379 | A1 | 10/2009 | Kondo et al. | |
| 2010/0127956 | A1 * | 5/2010 | Kang | G09G 3/3233 345/76 |
| 2010/0156866 | A1 | 6/2010 | Yeo et al. | |
| 2010/0220040 | A1 * | 9/2010 | Kwak | G09G 3/3233 345/76 |
| 2010/0309204 | A1 | 12/2010 | Smith et al. | |
| 2011/0084947 | A1 * | 4/2011 | Chung | G09G 3/3233 345/76 |
| 2011/0102413 | A1 | 5/2011 | Hamer et al. | |
| 2011/0164016 | A1 * | 7/2011 | Kang | G09G 3/3233 345/82 |
| 2011/0193852 | A1 * | 8/2011 | Lee | G02F 1/133555 345/92 |
| 2011/0279709 | A1 | 11/2011 | Nonaka et al. | |
| 2012/0026143 | A1 * | 2/2012 | Jang | G09G 3/3233 345/76 |
| 2012/0038690 | A1 | 2/2012 | Lee | |
| 2012/0050274 | A1 | 3/2012 | Yoo et al. | |
| 2012/0105496 | A1 * | 5/2012 | Komiya | G09G 3/003 345/77 |
| 2012/0287308 | A1 | 11/2012 | Kojima et al. | |
| 2013/0002632 | A1 * | 1/2013 | Choi | G09G 3/325 345/76 |
| 2013/0141402 | A1 | 6/2013 | Lee | |
| 2014/0184484 | A1 * | 7/2014 | Miyake | G09G 3/3688 345/87 |
| 2014/0267101 | A1 | 9/2014 | Iwaki | |
| 2014/0333677 | A1 * | 11/2014 | Kim | G09G 3/3291 345/76 |
| 2015/0054812 | A1 * | 2/2015 | Jeon | G09G 3/3233 345/82 |
| 2015/0138328 | A1 | 5/2015 | Yokohama | |
| 2015/0215545 | A1 | 7/2015 | Hayashi et al. | |
| 2015/0243232 | A1 | 8/2015 | Kim et al. | |
| 2015/0287362 | A1 * | 10/2015 | Lee | G09G 3/3266 315/173 |
| 2016/0124491 | A1 * | 5/2016 | An | G06F 1/3265 713/323 |
| 2016/0227093 | A1 | 8/2016 | Nonaka et al. | |
| 2016/0232827 | A1 | 8/2016 | Chen et al. | |
| 2016/0284282 | A1 | 9/2016 | Zhang et al. | |
| 2016/0351103 | A1 | 12/2016 | Park et al. | |
| 2017/0352313 | A1 | 12/2017 | Miyake | |
| 2018/0061358 | A1 | 3/2018 | Jung | |
| 2018/0226025 | A1 * | 8/2018 | Wu | G09G 3/3258 |
| 2018/0293939 | A1 | 10/2018 | Kim et al. | |
| 2019/0005862 | A1 | 1/2019 | Zhang | |

FOREIGN PATENT DOCUMENTS

| | | | |
|---|---|---|---|
| CN | 101807385 | A | 8/2010 |
| CN | 101996573 | A | 3/2011 |
| CN | 102376251 | A | 3/2012 |
| CN | 102411898 | A | 4/2012 |
| CN | 102930839 | A | 2/2013 |
| CN | 104662596 | A | 5/2015 |
| CN | 106328056 | A | 1/2017 |
| CN | 206210357 | U | 5/2017 |
| CN | 106981270 | A | 7/2017 |
| CN | 109545149 | A | 3/2019 |
| JP | 2004177576 | A | 6/2004 |
| JP | 2004233949 | A | 8/2004 |
| KR | 1020150079752 | A | 7/2015 |
| KR | 1020150146117 | A | 12/2015 |
| KR | 1020160052942 | A | 5/2016 |
| KR | 1020170036866 | A | 4/2017 |
| KR | 1020170086761 | A | 7/2017 |

* cited by examiner

ORGANIC LIGHT EMITTING DISPLAY DEVICE

This application is a continuation of U.S. patent application Ser. No. 17/891,455, filed on Aug. 19, 2022, which is a continuation of U.S. patent application Ser. No. 17/113,723, filed on Dec. 7, 2020, which is a continuation of U.S. patent application Ser. No. 16/039,524, filed on Jul. 19, 2018, which claims priority to Korean Patent Application No. 10-2017-0122539, filed on Sep. 22, 2017, and all the benefits accruing therefrom under 35 U.S.C. § 119, the content of which in its entirety is herein incorporated by reference.

BACKGROUND

1. Field

Embodiments of the disclosure relate to an organic light emitting display device.

2. Description of the Related Art

With the development of information technologies, the importance of a display device which is a connection medium between a user and information increases. Accordingly, display devices, such as a liquid crystal display device and an organic light emitting display device, are widely used in various fields.

Among such display devices, the organic light emitting display device displays images using an organic light emitting diode that generates light by recombination of electrons and holes. The organic light emitting display device has a high response speed and is driven with low power consumption.

Recently, a method for driving an organic light emitting display device at a low frequency to minimize power consumption has been used.

SUMMARY

In a method for driving an organic light emitting display device at a low frequency, it is desired to improve display quality when the organic light emitting display device is driven at a low frequency using the method.

Embodiments of the invention provide an organic light emitting display device with improved display quality.

According to an embodiment of the disclosure, an organic light emitting display device, which displays an image in a first mode or with a second driving frequency lower than the first driving frequency in a second mode, includes: a first scan driver which supplies a first scan signal having a first voltage to first scan lines; a second scan driver which supplies a second scan signal having a second voltage larger than the first voltage to second scan lines; and a pixel unit including a plurality of pixels, each coupled to a corresponding first scan line among the first scan lines and a corresponding second scan line among the second scan lines. In such an embodiment, when an first image displayed in the second mode is changed to a second image to be displayed in the second mode, the second image is displayed in the first mode during a predetermined portion of a period, in which the second image is displayed, and is displayed in the second mode during the remaining portion of the period.

In an embodiment, when the organic light emitting display device is in the first mode, the first scan driver may repeatedly supply the first scan signal to each of the first scan lines during every first unit frame period corresponding to the first driving frequency, and the second scan driver may repeatedly supply the second scan signal to each of the second scan lines during every first unit frame period.

In an embodiment, when the organic light emitting display device is in the second mode, the first scan driver may supply k (k is a natural number) first scan signals to each of the first scan lines during a second unit frame period corresponding to the second driving frequency, and the second scan driver may supply j (j is a natural number smaller than k) second scan signals to each of the second scan lines during the second unit frame period.

In an embodiment, the second unit frame period may include a first period and a second period, and when the organic light emitting display device is in the second mode, the second scan driver may supply the second scan signals to the second scan lines during the first period.

In an embodiment, the first period may be equal to the first unit frame period.

In an embodiment, the second scan driver may not supply the second scan signal during the second period.

In an embodiment, the organic light emitting display device may further include a data driver which supplies a data signal to data lines coupled to the pixels. In such an embodiment, the data driver may supply the data signal to be synchronized with the second scan signal.

In an embodiment, the data driver may supply a voltage of a reference power source to the data lines during a portion of the second unit frame period.

In an embodiment, the second period may be longer than the first period.

In an embodiment, the predetermined portion of the period may be shorter than the remaining portion of the period.

In an embodiment, the predetermined portion of the period may be set in a way such that first to q-th frames of the second image is displayed in the first mode and the second image is displayed in the second mode from a (q+1)-th frame, where q may be a natural number of 2 or greater.

In an embodiment, the predetermined portion of the period may be two times of the first unit frame period or greater.

In an embodiment, each of pixels located on an i-th (i is a natural number) horizontal line may include: an organic light emitting diode; and a pixel circuit coupled to an anode electrode of the organic light emitting diode, the pixel circuit which controls an amount of current flowing through the organic light emitting diode.

In an embodiment, when the organic light emitting display device is in the second mode, the anode electrode of the organic light emitting diode may be initialized to the voltage of an initialization power source k times during the second unit frame period.

In an embodiment, the pixel circuit may include: a first transistor which controls an amount of a current flowing a first power source coupled to a first electrode thereof to a second power source via the organic light emitting diode, where the amount of the current is corresponding to a voltage of a node coupled to a gate electrode thereof, a second transistor coupled between a data line and the first electrode of the first transistor, where the second transistor is turned on when an i-th first scan signal is supplied thereto; a third transistor coupled between a second electrode of the first transistor and the node, where the third transistor is turned on when an i-th second scan signal is supplied thereto; and a fourth transistor coupled between the node and the initialization power source, where the fourth transistor is turned on when an (i−1)-th second scan signal is supplied thereto.

In an embodiment, the first transistor and the second transistor may be P-type transistors, and the third transistor and the fourth transistor may be N-type oxide semiconductor transistors.

In an embodiment, the fifth transistor, the sixth transistor and the seventh transistor may be P-type transistors.

In an embodiment, the pixel circuit may further include: a fifth transistor coupled between the first power source and the first transistor; a sixth transistor coupled between the first transistor and the organic light emitting diode; and a seventh transistor coupled between the initialization power source and the organic light emitting diode.

In an embodiment, the fifth transistor, the sixth transistor and the seventh transistor may be P-type transistors.

In an embodiment, the fifth transistor and the sixth transistor may be formed as P-type transistors and the seventh transistor may be an N-type oxide semiconductor transistor.

In an embodiment, the organic light emitting display device may further include a third scan driver which supplies a third scan signal having the second voltage to third scan lines coupled to the pixels. In such an embodiment, the seventh transistor may be turned on when an i-th third scan signal is supplied thereto.

In an embodiment, when the organic light emitting display device is in the second mode, the third scan driver may supply k third scan signals to each of the third scan lines during the second unit frame period.

In an embodiment, the organic light emitting display device may further include an emission driver which supplies an emission control signal to emission control lines coupled to the pixels. In such an embodiment, gate electrodes of the fifth transistor, the sixth transistor, and the seventh transistor may be coupled to an i-th emission control line.

According to another embodiment of the disclosure, there is provided an organic light emitting display device which displays an image with a first driving frequency in a first mode or with a second driving frequency lower than the first driving frequency in a second mode. In such an embodiment, the organic light emitting display device includes: pixels, each including an organic light emitting diode and a pixel circuit which controls an amount of a current flowing through the organic light emitting diode, where the pixel circuit includes a plurality of P-type transistors and a plurality of N-type oxide semiconductor transistors. In such an embodiment, when an image displayed in the second mode is changed to another image to be displayed in the second mode, the second image is displayed in the first mode during a portion of a period, in which the second image is displayed, and the second image is displayed in the second mode during the remaining portion of the period.

In an embodiment, the organic light emitting display device may further include: a first scan driver which supplies a first scan signal to first scan lines coupled to at least some of the plurality of P-type transistors; a second scan driver which supplies a second scan signal to second scan lines coupled to at least some of the plurality of N-type oxide semiconductor transistors; and a data driver which supplies a data signal to data lines coupled to the pixels.

In an embodiment, when the organic light emitting display device is in the second mode, one frame period may include a first period and a second period. In such an embodiment, when the organic light emitting display device is in the second mode, the second scan driver may not supply the second scan signal during the second period.

In an embodiment, when the organic light emitting display device is in the second mode, the data driver may supply a voltage of a reference power source to the data lines during the second period.

According to another embodiment of the disclosure, there is provided an organic light emitting display device which displays an image with a first driving frequency in a first mode or with a second driving frequency lower than the first driving frequency in a second mode. In such an embodiment, the organic light emitting display device includes: pixels coupled to first scan lines, second scan lines, and data lines; a first scan driver which supplies a first scan signal to the first scan lines; a second scan driver which supplies a second scan signal to the second scan lines; a timing controller which supplies start pulses of which numbers are equal to each other to the first scan driver and the second scan driver in the first mode, and supply start pulses of which numbers are different from each other to the first scan driver and the second scan driver in the second mode. In such an embodiment, when an image displayed in the second mode is changed to another image to be displayed in the second mode, the another image is displayed in the first mode during a portion of a period, in which the another image is displayed, and the another image is displayed in the second mode during the remaining portion of the period.

In an embodiment, when the organic light emitting display device is in the second mode, the timing controller may supply h (h is a natural number of 2 or greater) start pulses to the first scan driver during one frame period, and supply p (p is a natural number less than h) start pulses to the second scan driver during the one frame period.

In an embodiment, the portion of the period may be shorter than the remaining portion of the period.

In an embodiment, each of pixels may include: an organic light emitting diode; and a pixel circuit coupled to an anode electrode of the organic light emitting diode, where the pixel circuit controls an amount of a current flowing through the organic light emitting diode, and the pixel circuit may include a plurality of P-type transistors and a plurality of N-type oxide semiconductor transistors.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1A:
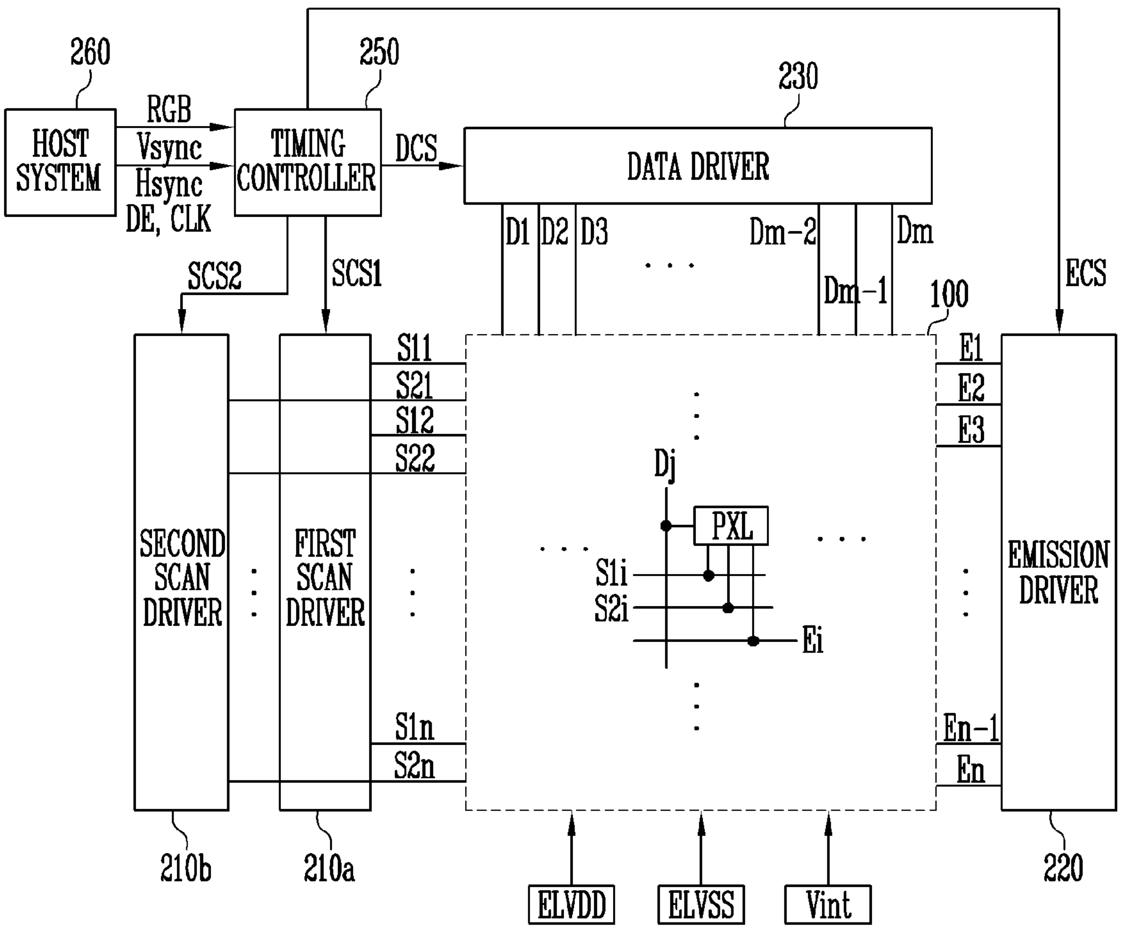
FIG. 1A is a diagram schematically illustrating a configuration of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of an organic light emitting display device and a driving method thereof will be described with reference to the accompanying drawings.

FIG. TA is a diagram schematically illustrating a configuration of a display device according to an embodiment of the disclosure.

Referring to FIG. TA, an embodiment of the organic light emitting display device may include a pixel unit 100, a first scan driver 210*a*, a second scan driver 210*b*, an emission driver 220, a data driver 230, a timing controller 250, and a host system 260.

In an embodiment, the host system 260 may supply image data RGB to the timing controller 250 through a predetermined interface. In such an embodiment, the host system 260 may supply timing signals Vsync, Hsync, DE, and CLK to the timing controller 250.

In an embodiment, the timing controller 250 may generate scan driving control signals SCS1 and SCS2, a data driving control signal DCS, and an emission driving control signal ECS, based on signals input from the host system 260. The scan driving control signals SCS1 and SCS2 generated by the timing controller 250 are supplied to the scan drivers 210*a* and 210*b*, the data driving control signal DCS generated by the timing controller 250 is supplied to the data driver 230, and the emission driving control signal ECS generated by the timing controller 250 is supplied to the emission driver 220. In such an embodiment, the timing controller 250 realigns image data RGB supplied from the outside and supplies the realigned image data to the data driver 230.

Figure 8:
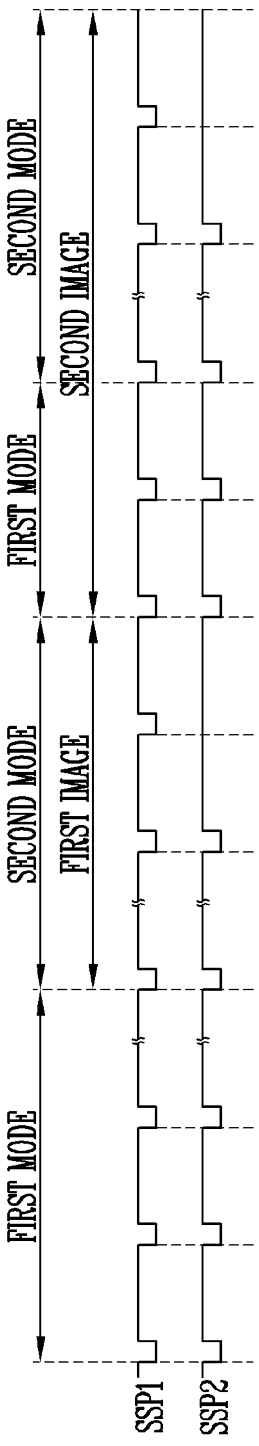
FIG. 8 is a diagram exemplarily illustrating waveform diagrams of start pulses supplied to a first scan driver and a second scan driver, which are shown in FIG. 1A.

The scan driving control signals SCS1 and SCS2 may include a clock signal CLK and a start pulse SSP1 and SSP2 (shown in FIG. 8).

In an embodiment, the start pulse SSP1 and SSP2 may include a first start pulse SSP1 and a second start pulse SSP2. The first start pulse SSP1 may control the output timing of a first scan signal output for the first time from the first scan driver 210*a*. In such an embodiment, the second start pulse SSP2 may control the output timing of a second scan signal output for the first time from the second scan driver 210*b*. In an embodiment, the first and second start pulses SSP1 and SSP2 may be shifted in the first scan driver 210*a* and the second scan driver 210*b*, respectively, based on the clock signal.

The emission driving control signal ECS may include a clock signal CLK and a start pulse.

The data driving control signal may include a source start pulse and clock signals. In an embodiment, the sampling start time of data may be controlled in the emission driver 220 based on the source start pulse, and a sampling operation may be controlled in the emission driver 220 based on the clock signals.

The first scan driver 210*a* may supply a first scan signal to first scan lines S11 to S1n in response to a first scan driving control signal SCS1. In one embodiment, for example, the first scan driver 210*a* may sequentially supply the first scan signal to the first scan lines S11 to S1n. When the first scan signal is sequentially supplied to the first scan lines S11 to S1n, pixels PXL may be selected in units of horizontal lines. In such an embodiment, the first scan signal may be set to have a gate-on voltage (e.g., a voltage having a low potential (low level)) to turn on transistors included in the pixels PXL.

The second scan driver 210*b* may supply a second scan signal to second scan lines S21 to S2n in response to a second scan driving control signal SCS2. In one embodiment, for example, the second scan driver 210*b* may sequentially supply the second scan signal to the second scan lines S21 to S2n. The second scan signal may be set to a gate-on voltage (e.g., a voltage having a high potential (high level)) to turn on the transistors included in the pixels PXL.

In an embodiment, the organic light emitting display device may be driven in a first mode in which the organic light emitting display device is driven at a first driving frequency (e.g., a normal driving frequency) or in a second mode in which the organic light emitting display device is driven at a second driving frequency (e.g., a low driving frequency) less than the first driving frequency. In one embodiment, for example, the first driving frequency may be 60 hertz (Hz) or 120 Hz, and the second driving frequency may be 1 Hz.

The first scan driver 210*a* and the second scan driver 210*b* may selectively supply the scan signals to the scan lines S11 to S1n and S21 to S2n, based on the driving frequency.

In one embodiment, for example, when the organic light emitting display device is driven in the first mode, the first scan signal and the second scan signal may be repeatedly supplied to the first scan lines S11 to S1n and to the second scan lines S21 to S2n, respectively, for every predetermined period.

When the organic light emitting display device is driven in the second mode, the first scan signal may be repeatedly supplied to the first scan lines S11 to S1n for every predetermined period, and the second scan signal may stop being supplied to the second scan lines S21 to S2n during a predetermined period.

The data driver 230 may supply a data signal to data lines D1 to Dm in response to the data driving control signal DCS. The data signal supplied to the data lines D1 to Dm may be supplied to pixels PXL by the first scan signal. In such an embodiment, the data driver 230 may supply the data signal to the data lines D1 to Dm to be synchronized with the first scan signal.

The emission driver 220 may supply an emission control signal to emission control lines E1 to En in response to the emission driving control signal ECS. In one embodiment, for example, the emission driver 220 may sequentially supply the emission control signal to the emission control lines E1 to En. In such an embodiment, when the emission control signal is sequentially supplied to the emission control lines E1 to En, the pixels PXL do not emit light in units of horizontal lines. In such an embodiment, the emission control signal may be set to a gate-off voltage (e.g., a voltage having a high potential (high level)) such that the transistors included in the pixels PXL may be turned off.

In an embodiment, as shown in FIG. 1A, the scan drivers 210*a* and 210*b* and the emission driver 220 may be components separated from one another, but the disclosure is not limited thereto. In one alternative embodiment, for example, the scan drivers 210*a* and 210*b* and the emission driver 220 may be included in a single driver.

In an embodiment, the scan drivers 210*a* and 210*b* and/or the emission driver 220 may be mounted on a substrate through a thin film process. In an embodiment, the scan drivers 210*a* and 210*b* and/or the emission driver 220 may be located at both sides with the pixel unit 100 interposed therebetween.

The pixel unit 100 may include a plurality of pixels PXL coupled (or connected) to the data lines D1 to Dm, the scan lines S11 to S1n and S21 to S2n, and the emission control lines E1 to En.

The pixels PXL may be supplied with an initialization power source Vint, a first power source ELVDD, and a second power source ELVSS.

Each of the pixels PXL may be selected when the scan signal is supplied to a scan line S11 to S1n or S21 to S2n coupled thereto, to be supplied with the data signal from a data line D1 to Dm. The pixel PXL supplied with the data signal may control an amount of current flowing from the first power source ELVDD to the second power source ELVSS via an organic light emitting diode (not shown), corresponding to the data signal.

In an embodiment, the organic light emitting diode may generate light with a predetermined luminance corresponding to the amount of current. In such an embodiment, the first power source ELVDD may be set to a voltage higher than that of the second power source ELVSS.

In an embodiment, as shown in FIG. TA, the pixel PXL may be coupled to a first scan line S1i, a second scan line S2i, a data line Dj, and an emission control line E1, but the disclosure is not limited thereto. In an alternative embodiment, signal lines coupled to the pixel PXL may be variously set corresponding to the circuit structure of the pixel PXL.

Figure 1B:
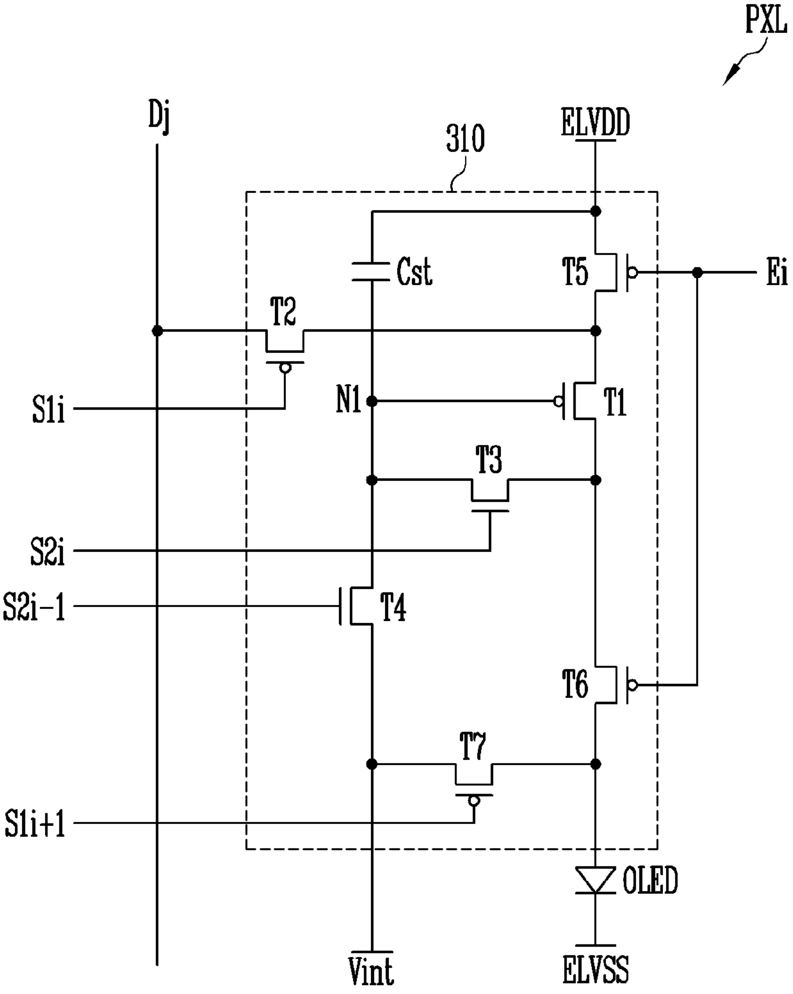
FIG. 1B is a diagram illustrating an embodiment of a pixel shown in FIG. 1A.

FIG. 1B is a diagram illustrating an embodiment of the pixel shown in FIG. TA. For convenience of illustration and description, a pixel PXL that is located on an i-th horizontal line and is coupled to the j-th data line Dj is illustrated in FIG. 1B.

Referring to FIG. 1B, an embodiment of the pixel PXL may include an organic light emitting diode OLED and a pixel circuit 310 for controlling an amount of current supplied to the organic light emitting diode OLED.

An anode electrode of the organic light emitting diode OLED may be coupled to the pixel circuit 310, and a cathode electrode of the organic light emitting diode OLED may be coupled to the second power source ELVSS.

The organic light emitting diode OLED may generate light with a predetermined luminance corresponding to an amount of current supplied from the pixel circuit 310.

The pixel circuit 310 may control an amount of current flowing from the first power source ELVDD to the second power source ELVSS via the organic light emitting diode OLED, corresponding to the data signal.

In an embodiment, as shown in FIG. 1B, the pixel circuit 310 may include first to seventh transistors T1 to T7 and a storage capacitor Cst.

The first transistor T1, the second transistor T2, and the fifth to seventh transistors T5 to T7 may be P-type transistors. In one embodiment, for example, the first transistor T1, the second transistor T2, and the fifth to seventh transistors T5 to T7 may be P-type poly-silicon semiconductor transistors.

In an embodiment, the third transistor T3 and the fourth transistor T4 may be N-type transistors. In one embodiment, for example, the third transistor T3 and the fourth transistor T4 may be N-type oxide semiconductor transistors.

The oxide semiconductor transistor may be formed through a low temperature process, and has a charge mobility lower than that of the poly-silicon semiconductor transistor. Accordingly, the oxide semiconductor transistor has high off-current characteristics. Thus, in an embodiment, where the third transistor T3 and the fourth transistor T4 are formed as oxide semiconductor transistors, leakage current from a first node N1 may be minimized, such that the display quality of the organic light emitting display device may be improved.

Figure 2A:
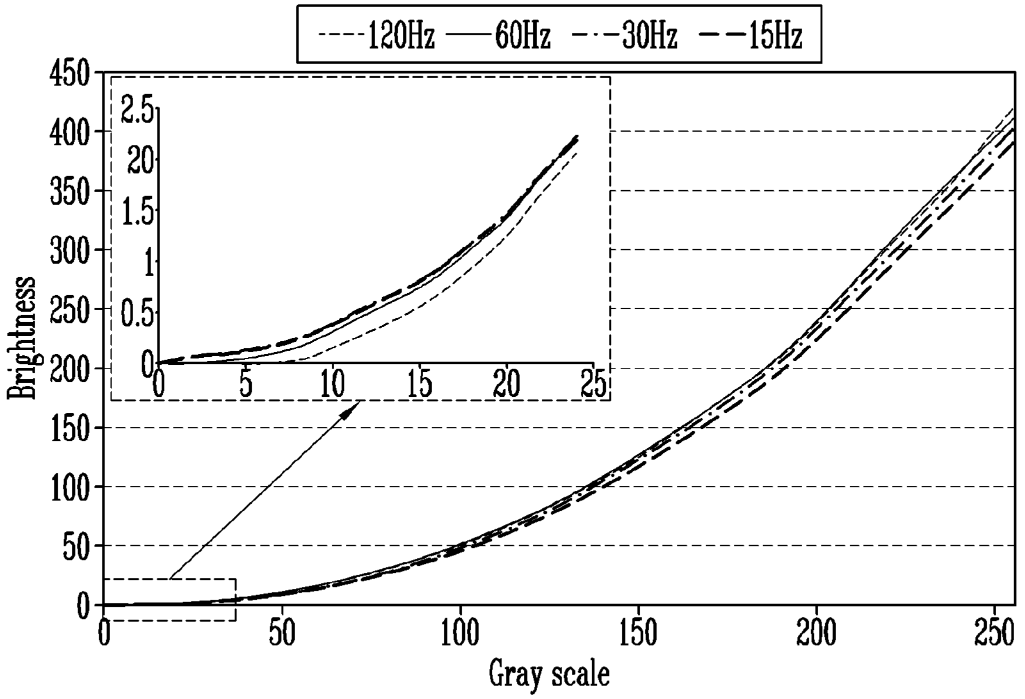
FIG. 2A is a graph illustrating gamma characteristics of a display device according to a conventional art.
Figure 2B:
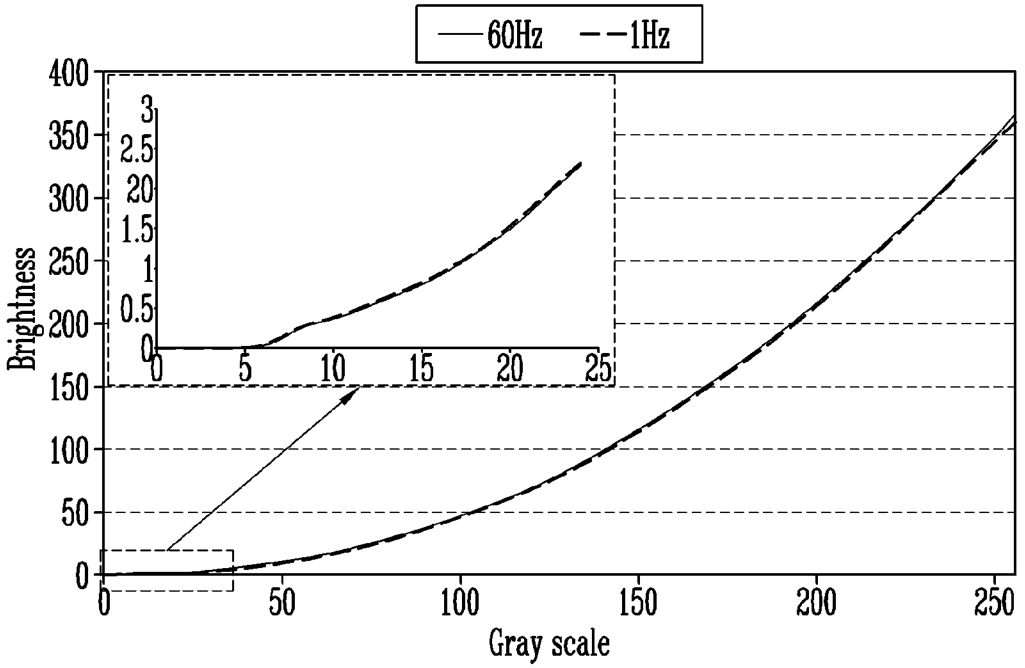
FIG. 2B is a graph illustrating gamma characteristics of the display device according to the embodiment of the disclosure.

FIG. 2A is a graph illustrating gamma characteristics of a display device provided with a pixel including the poly-silicon semiconductor transistor (hereinafter, referred to as a display device according to a conventional art). FIG. 2B is a graph illustrating gamma characteristics of a display device provided with a pixel including both of the poly-silicon semiconductor transistor and the oxide semiconductor transistor (hereinafter, referred to a display device according to an embodiment of the disclosure).

In particular, FIG. 2A shows a first graph illustrating gamma characteristics when the display device according to the conventional art is driven at a driving frequency of 120 Hz, a second graph illustrating gamma characteristics when the display device according to the conventional art is driven at a driving frequency of 60 Hz, a third graph illustrating gamma characteristics when the display device according to the conventional art is driven at a driving frequency of 30 Hz, and a third graph illustrating gamma characteristics when the display device according to the conventional art is driven at a driving frequency of 15 Hz.

As shown in FIG. 2A, the first to fourth graphs are all different from each other. In particular, as shown in FIG. 2A, variations between the graphs at low gray scales are large. Accordingly, when the driving frequency of the display device according to the conventional art is changed, a user may recognize the driving frequency change.

FIG. 2B shows a fifth graph illustrating gamma characteristics when the display device according to the embodiment of the disclosure is driven at a driving frequency of 60 Hz and a sixth graph illustrating gamma characteristics when the display device according to the embodiment of the disclosure is driven at a driving frequency of 1 Hz.

As shown in FIG. 2B, the fifth graph and the sixth graph are substantially the same as each other. In particular, as shown in FIG. 2B, the same gamma characteristics are shown even at low gray scales, regardless of driving frequencies.

Accordingly, in an embodiment, where the pixel incudes both of the poly-silicon semiconductor transistor and the oxide semiconductor transistor, the change in driving frequency is effectively prevented from being recognized by the user.

Referring back to FIG. 1B, in an embodiment, the seventh transistor T7 may be coupled between the initialization power source Vint and the organic light emitting diode OLED. In such an embodiment, a gate electrode of the seventh transistor T7 may be coupled to an (i+1)-th scan line S1i+1. The seventh transistor T7 may be turned on when the first scan signal is supplied to the (i+1)-th scan line S1i+1, to supply the voltage of the initialization power source Vint to the anode electrode of the organic light emitting diode OLED. Here, the initialization power source Vint may have a voltage lower than that of the data signal.

The sixth transistor T6 may be coupled between the first transistor T1 and the organic light emitting diode OLED. In such an embodiment, a gate electrode of the sixth transistor T6 may be coupled to an i-th emission control line E1. The sixth transistor T6 may be turned on when the emission control signal is supplied to the i-th emission control line E1, and be turned off otherwise.

The fifth transistor T5 may be coupled between the first power source ELVDD and the first transistor T1. In such an embodiment, a gate electrode of the fifth transistor T5 may be coupled to the i-th emission control line E1. The fifth transistor T5 may be turned on when the emission control signal is supplied to the i-th emission control line E1, and be turned off otherwise.

In an embodiment, a first electrode of the first transistor (e.g., a driving transistor) T1 may be coupled to the first power source ELVDD via the fifth transistor T5, and a second electrode of the first transistor T1 may be coupled to the anode electrode of the organic light emitting diode OLED via the sixth transistor T6. In such an embodiment, a gate electrode of the first transistor T1 may be coupled to the first node N1. The first transistor T1 may control the amount of current flowing from the first power source ELVDD to the second power source ELVSS via the organic light emitting diode OLED, corresponding to a voltage of the first node N1.

The third transistor T3 may be coupled between the second electrode of the first transistor T1 and the first node N1. In such an embodiment, a gate electrode of the third transistor T3 may be coupled to the i-th second scan line S2i. The third transistor T3 may be turned on when the scan signal is supplied to the i-th second scan line S2i, to allow the second electrode of the first transistor T1 and the first node N1 to be electrically coupled to each other. Therefore, when the third transistor T3 is turned on, the first transistor T1 may be diode-coupled.

The fourth transistor T4 may be coupled between the second electrode of the first transistor T1 and the initialization power source Vint. In such an embodiment, a gate electrode of the fourth transistor T4 may be coupled to an (i−1)-th second scan line S2i−1. The fourth transistor T4 may be turned on when the scan signal is supplied to the (i−1)-th second scan line S2i−1, to supply the voltage of the initialization power source Vint to the first node N1.

The second transistor T2 may be coupled between the j-th data line Dj and the first electrode of the first transistor T1. In such an embodiment, a gate electrode of the second transistor T2 may be coupled to an i-th first scan line S1i. The second transistor T2 may be turned on when the scan signal is supplied to the i-th first scan line S1i, to allow the j-th data line Dj and the first electrode of the first transistor T1 to be electrically coupled to each other.

The storage capacitor Cst may be coupled between the first power source ELVDD and the first node N1. The storage capacitor Cst may store a voltage corresponding to the data signal and a threshold voltage of the first transistor T1.

Figure 3:
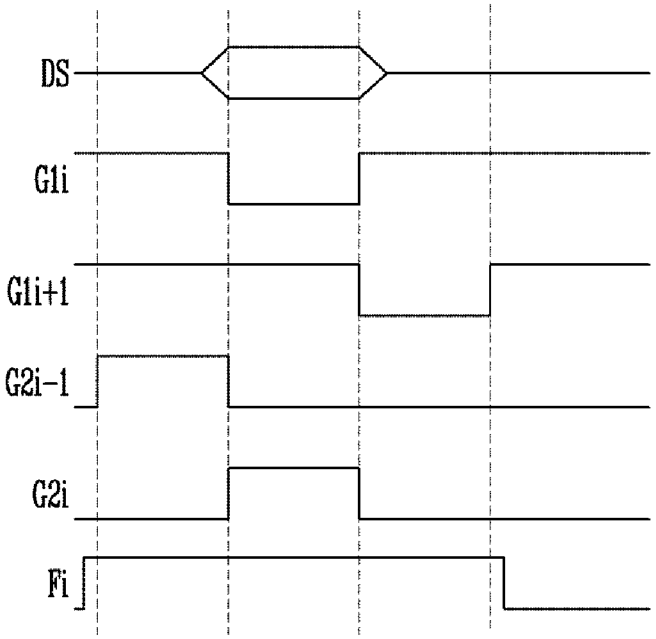
FIG. 3 is a signal timing diagram illustrating an embodiment of a driving method of the pixel shown in FIG. 1B.

FIG. 3 is a signal timing diagram illustrating an embodiment of a driving method of the pixel shown in FIG. 1B.

Referring to FIG. 3, in an embodiment, the first scan signal may be set to a low-potential (low-level) voltage to turn on the first transistor T1, the second transistor T2, and the fifth to seventh transistors T5 to T7, which are P-type transistors. In such an embodiment, the second scan signal may be set to a high-potential (high-level) voltage to turn on the third transistor T3 and the fourth transistor T4, which are N-type transistors.

In such an embodiment, an emission control signal Fi is supplied to the i-th emission control line E1. When the emission control signal Fi is supplied to the i-th emission control line E1, the fifth transistor T5 and the sixth transistor T6 are turned off, such that the pixel PXL may be in a non-emission state.

Subsequently, a second scan signal G2i−1 is supplied to the (i−1)-th second scan line S2i−1. When the second scan signal G2i−1 is supplied to the (i−1)-th second scan line S2i−1, the fourth transistor T4 is turned on. When the fourth transistor T4 is turned on, the voltage of the initialization power source Vint is supplied to the first node N1, and the first node N1 may be initialized to the voltage of the initialization power source Vint.

When the first node N1 is initialized to the voltage of the initialization power source Vint, first and second scan signals G1i and G2i are supplied to the i-th first scan line S1i and the i-th second scan line S2i, respectively.

When the second scan signal G2i is supplied to the i-th second scan line S2i, the third transistor T3 is turned on. When the third transistor T3 is turned on, the first transistor T1 is diode-coupled.

When the first scan signal G1i is supplied to the i-th first scan line S1i, the second transistor T2 is turned on. When the second transistor T2 is turned on, a data signal DS from the j-th data line Dj is supplied to the first electrode of the first transistor T1, and the first transistor T1 may be turned on since the first node N1 is initialized to the voltage of the initialization power source Vint, which is lower than that of the data signal. When the first transistor T1 is turned on, the data signal DS supplied to the first electrode of the first transistor T1 is supplied to the first node N1 via the diode-coupled first transistor T1, and a voltage obtained by subtracting the threshold voltage of the first transistor T1 from the data signal DS is applied to the first node N1.

When the voltage obtained by subtracting the threshold voltage of the first transistor T1 from the data signal DS is applied to the first node N1, the storage capacitor Cst stores the voltage applied to the first node N1.

Next, a first scan signal G1i+1 is supplied to the (i+1)-th first scan line S1i+1, and accordingly, the seventh transistor T7 is turned on. If the seventh transistor T7 is turned on, the voltage of the initialization power source Vint is supplied to the anode electrode of the organic light emitting diode OLED. Thus, a parasitic capacitor parasitically formed in the organic light emitting diode OLED is discharged, and accordingly, the black expression ability of the pixel PXL may be improved.

Subsequently, the supply of the emission control signal Fi to the i-th emission control line E1 is stopped.

When the supply of the emission control signal Fi to the i-th emission control line E1 is stopped, the fifth transistor T5 and the sixth transistor T6 are turned on, and a current path from the first power source ELVDD to the second power source ELVSS via the fifth transistor T5, the first transistor T1, the sixth transistor T6, and the organic light emitting diode OLED is then formed.

When the current path is formed, the first transistor T1 controls the amount of current flowing from the first power source ELVDD to the second power source ELVSS via the organic light emitting diode OLED, corresponding to the voltage of the first node N1. The organic light emitting diode OLED generates light with a predetermined luminance corresponding to the amount of current supplied from the first transistor T1.

In an embodiment, each of the pixels PXL generates light with a predetermined luminance while repeating the above-described process.

The emission control signal Fi supplied to the i-th emission control line E1 may be supplied to overlap with at least the i-th first scan signal G1i such that the pixel PXL is set to the non-emission state during a period in which the data signal is charged in the pixel PXL. Such a supply timing of the emission control signal Fi may be changed in various forms.

Figure 4:
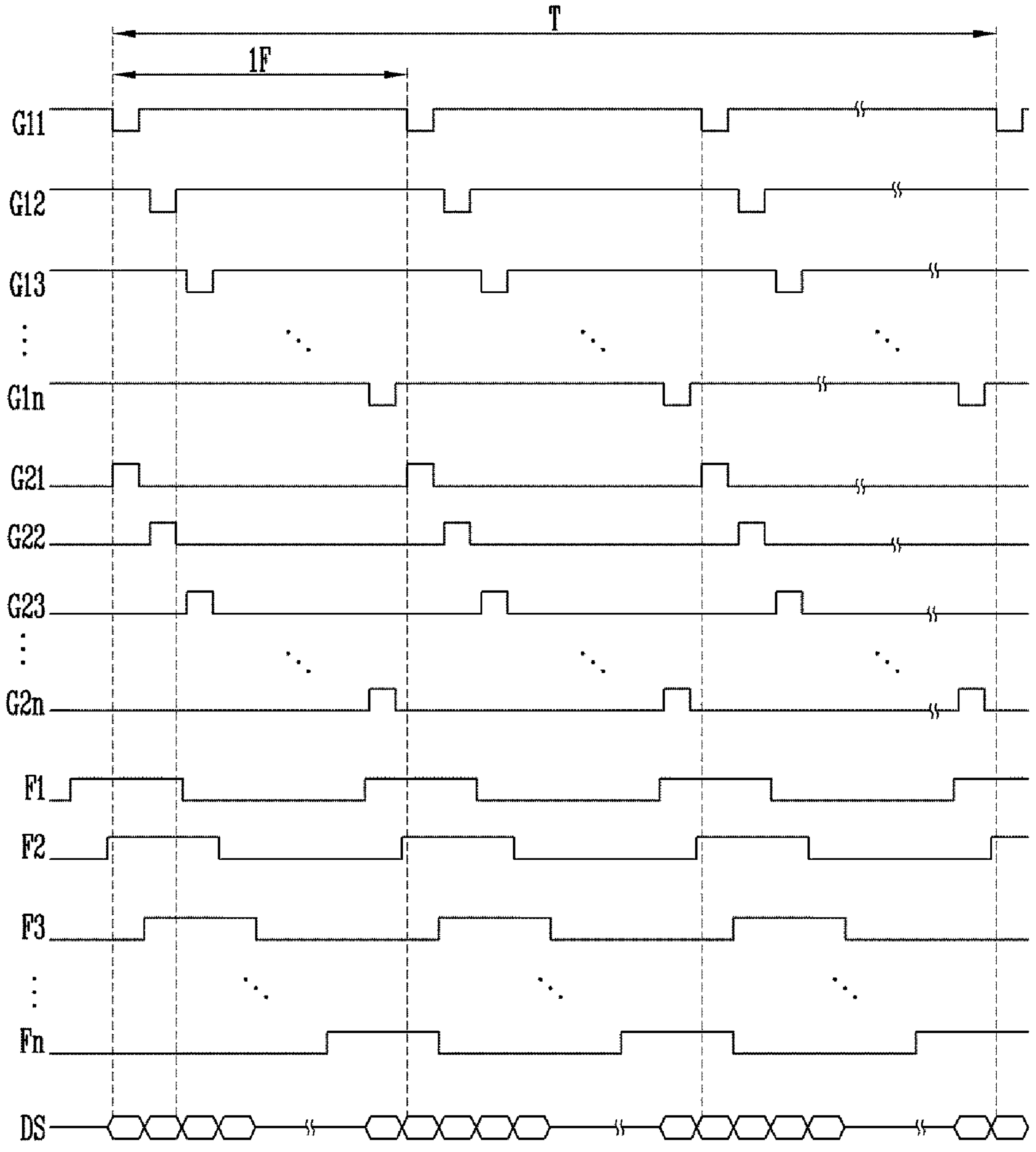
FIGS. 4 and 5 are signal timing diagrams illustrating an embodiment of a method for driving the organic light emitting display device shown in FIG. TA.

FIG. 4 is a signal timing diagram illustrating an embodiment of a method for driving the organic light emitting display device shown in FIG. 1A in the first mode.

Hereinafter, for convenience of description, it is assumed that the first driving frequency is 60 Hz. However, the disclosure is not limited thereto, and alternatively, the first driving frequency may be 120 Hz. In such an embodiment, the first driving frequency may be variously set.

In an embodiment, the organic light emitting display device is driven at the first driving frequency in the first mode, and is driven at the second driving frequency lower than the first driving frequency in the second mode.

Referring to FIG. 4, in the first mode, first scan signals G11 to G1n may be sequentially supplied during a first unit frame period 1F, and simultaneously, second scan signals G21 to G2n may be sequentially supplied during the first unit frame period 1F. In an embodiment, the first unit frame period 1F may be repeated a predetermined number of times (e.g., 60 times) corresponding to the first driving frequency during a unit period T (e.g., 1 second).

The first scan signals G11 to G1n may be repeatedly supplied during every first unit frame period 1F. The second scan signals G21 to G2n may also be repeatedly supplied during every first unit frame period 1F. In such an embodiment, as shown in FIG. 4, the i-th first scan signal G1i may overlap with the i-th second scan signal G2i.

Emission control signals F1 to Fn may be sequentially supplied during the first unit frame period 1F. The emission control signals F1 to Fn may be repeatedly supplied during every first unit frame period 1F.

A data signal DS may be supplied to be synchronized with the scan signals G11 to G1n and G21 to G2n.

Then, as described above with reference to FIGS. 2 and 3, a voltage corresponding to the data signal DS may be stored in each of the pixels PXL. Each of the pixels PXL generates light with a predetermined luminance, corresponding to the data signal DS, so that a predetermined image may be displayed in the pixel unit 100.

In the first mode, the data signal DS is stored in each of the pixels PXL whenever the first unit frame period 1F elapses.

Figure 5:
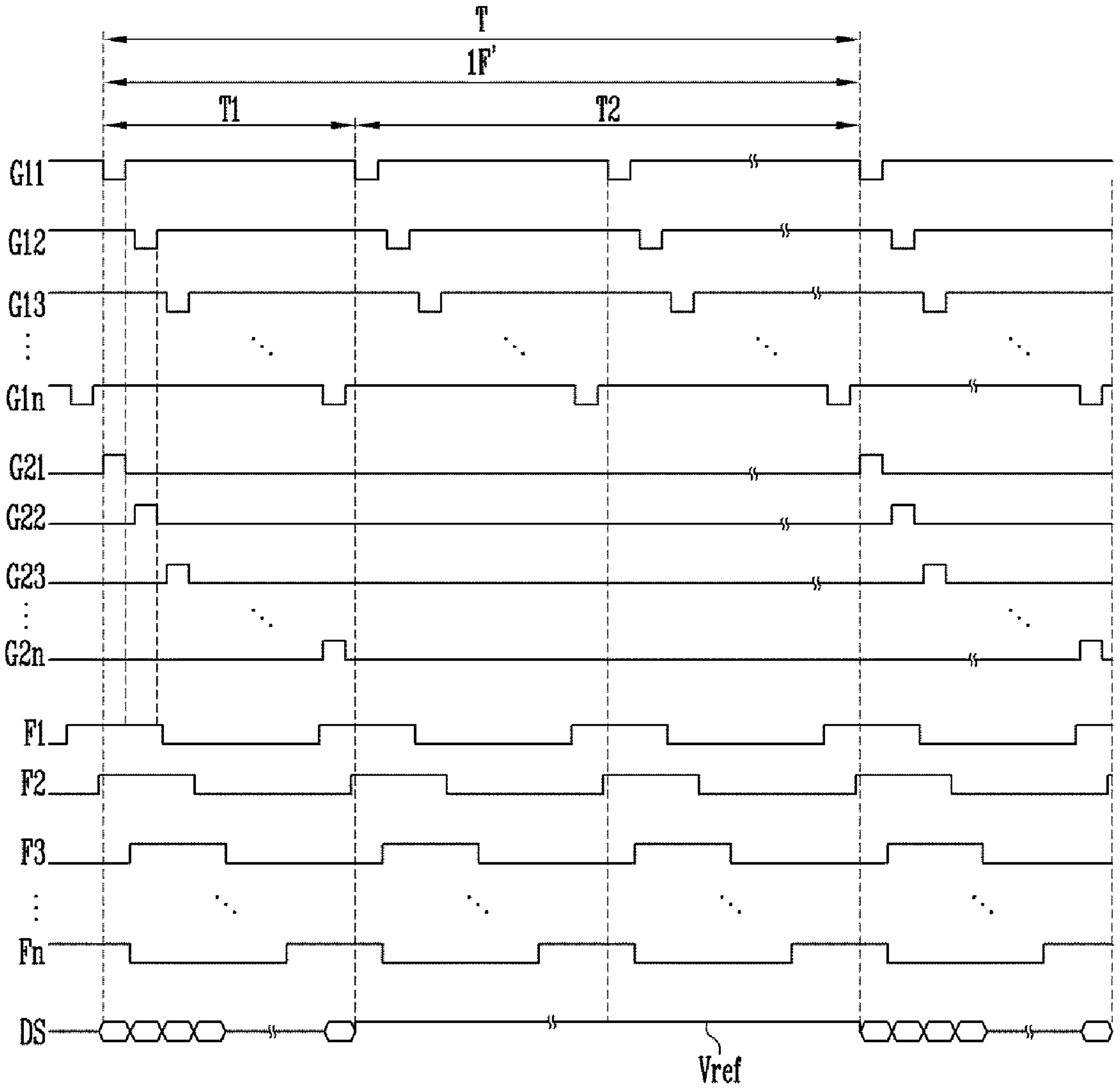

FIG. 5 is a signal timing diagram illustrating an embodiment of a method for driving the organic light emitting display device shown in FIG. 1A in the second mode.

Hereinafter, for convenience of description, it is assumed that the second driving frequency is 1 Hz. However, the disclosure is not limited thereto, and the second driving frequency may be variously set to be less than the first driving frequency.

Also, in FIG. 5, signals of an embodiment where the same image is displayed in the pixel unit 100 in the second mode is shown.

Referring to FIG. 5, a second unit frame period 1F' may include a first period T1 and a second period T2. Here, the second unit frame period 1F' may be repeated a predetermined number of times (e.g., once) corresponding to the second driving frequency during a unit period T (e.g., 1 second).

The second period T2 may be longer than the first period T1. In one embodiment, for example, the first period T1 may be set equal to the first unit frame period 1F. In such an embodiment, the second period T2 may be a period except the first period T1 in the second unit frame period 1F'.

The second scan signals G21 to G2n may be supplied in the first period T1. The second scan signals G21 to G2n may not be supplied in the second period T2.

In the second mode, the first scan signals G11 to G1n and the second scan signals G21 to G2n may be sequentially supplied during the first period T1.

Also, during the first period T1, the emission control signals F1 to Fn may be sequentially supplied, and the data signal DS may be supplied to be synchronized with the scan signals G11 to G1n and G21 to G2n. Then, a voltage corresponding to the data signal DS is stored in each of the pixels PXL during the first period T1.

In the second period T2, the first scan signals G11 to G1n are sequentially supplied, and may be repeatedly supplied with a predetermined frequency. Here, the predetermined period may be set equal to the first period T1.

However, the second scan signals G21 to G2n may not be supplied during the second period T2.

Also, during the second period T2, the emission control signals F1 to Fn are sequentially supplied, and may be repeatedly supplied with a predetermined frequency. The voltage of a reference power source Vref may be supplied to the data lines D1 to Dm during the second period T2.

Referring to FIGS. 2 and 5, during the first period T1, the voltage of the data signal DS is stored in each of the pixels PXL, and the first transistor T1 supplies, to the organic light emitting diode OLED, a predetermined current corresponding to a difference between the voltage of the first power source ELVDD and the voltage of the data signal DS applied to the first node N1.

Next, when the second period T2 starts, the fifth transistor T5 and the sixth transistor T6 of each of the pixels PXL are turned off by the emission control signals F1 to Fn, such that the pixels PXL is in the non-emission state.

Subsequently, the second transistor T2 and the seventh transistor T7 of each of the pixels PXL are sequentially turned on by the first scan signals G11 to G1n.

When the second transistor T2 is turned on, the voltage of the reference power source Vref from the data line Dm is supplied to the first electrode of the first transistor T1. Next, when the seventh transistor T7 is turned on, the anode electrode of the organic light emitting diode OLED is initialized to the voltage of the initialization power source Vint.

Subsequently, light is emitted from the pixels PXL by the emission control signals F1 to Fn.

During the second period T2, a process may be repeated, in which the voltage of the reference power source Vref is applied to the first electrode of the first transistor T1 after the pixels PXL are set to be in the non-emission state, and light is again emitted from the organic light emitting diode OLED after the anode electrode of the organic light emitting diode OLED is initialized to the voltage of the initialization power source Vint.

Such processes in the second unit frame period 1F' including the first period T1 and the second period T2 may be repeated while the same image is being displayed in the second mode.

Figure 6A:
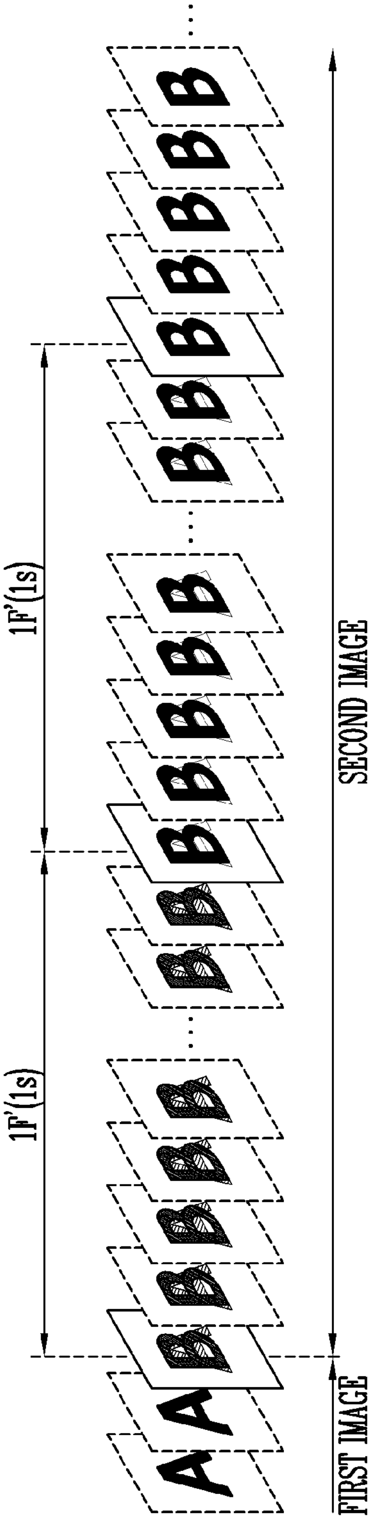
FIGS. 6A and 6B are diagrams illustrating a phenomenon that may occur when an image is changed while the organic light emitting display device is being driven at a second driving frequency.
Figure 6B:
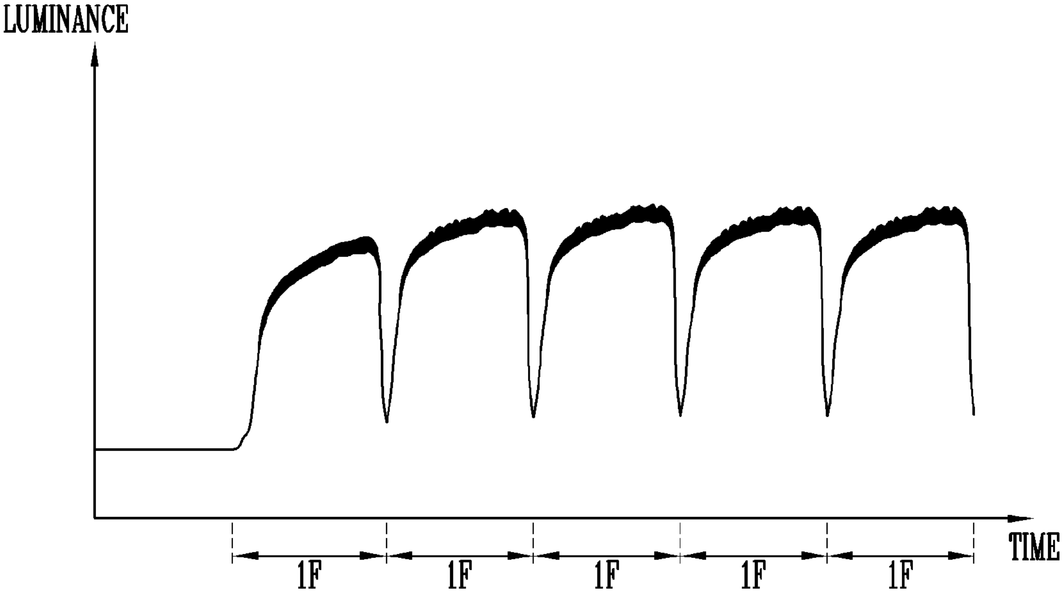

FIGS. 6A and 6B are diagrams illustrating a phenomenon that may occur when an image is changed while the organic light emitting display device is being driven at the second driving frequency.

Referring to FIG. 6A, an image that has been displayed through the pixel unit 100 may be changed to another image in the second mode. Here, the image before the change in image may be defined as a first image, and the image after the change in image may be defined as a second image.

When the first image is changed to the second image, the first image and the second image overlap with each other during two unit frame periods, due to a hysteresis characteristic of the driving transistor (i.e., the first transistor) T1 included in each of the pixels PXL. Accordingly, although only the second image is desired to be displayed in the organic light emitting display device as the first image is changed to the second image, an afterimage of the first image, which is the image before the change in image, may remain during a predetermined period.

In an embodiment, since the unit frame period is long in the second mode, the afterimage of the first image remains for a few seconds, and may be recognized by a user.

FIG. 6B is a graph illustrating luminance measure for each frame after the image displayed in the organic light emitting display device is changed from an image having a gray scale of '0' to an image having a gray scale of '32'. As shown in FIG. 6B, an image having a target luminance is not displayed at a time point when the image displayed in the organic light emitting display device is changed, and a few frames (e.g., at least three frames or more) are taken until the luminance of the changed image reaches to the target luminance after the image displayed in the organic light emitting display device is changed.

Accordingly, in the organic light emitting display device, an image having a desired luminance may not be displayed during an initial portion of the period in which the image displayed in the organic light emitting display device is changed, due to the characteristic of the driving transistor included in each of the pixels. In particular, when the organic light emitting display device is driven at a low frequency, the above-described phenomenon occurs.

In an embodiment of the disclosure, the organic light emitting display device is driven in the first mode during a predetermined period to prevent the above-described phenomenon.

This will hereinafter be described in greater detail with reference to FIGS. 7A and 7B.

Figure 7A:
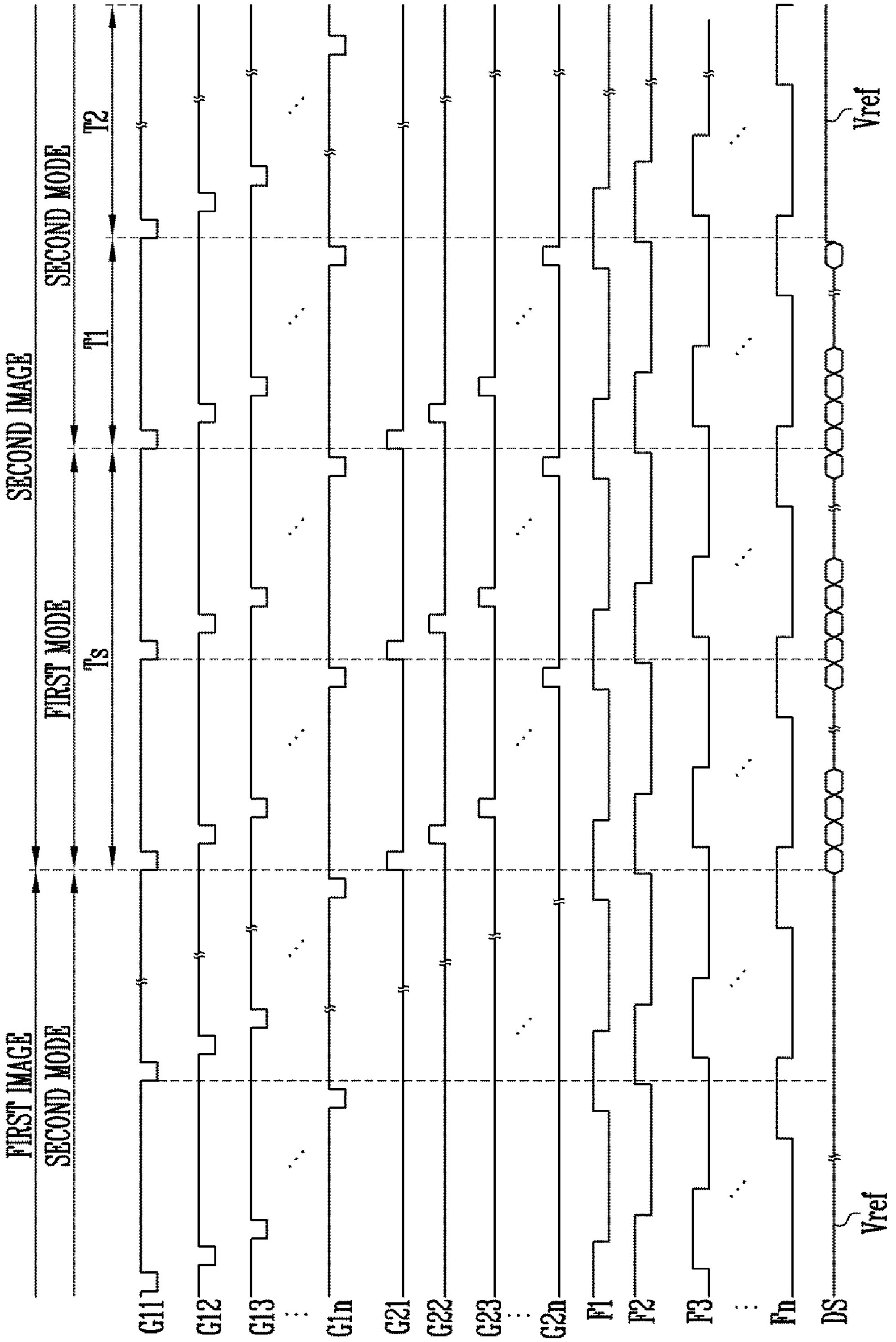
FIGS. 7A and 7B are diagrams illustrating an embodiment of a method for driving the organic light emitting display device shown in FIG. 1A.
Figure 7B:
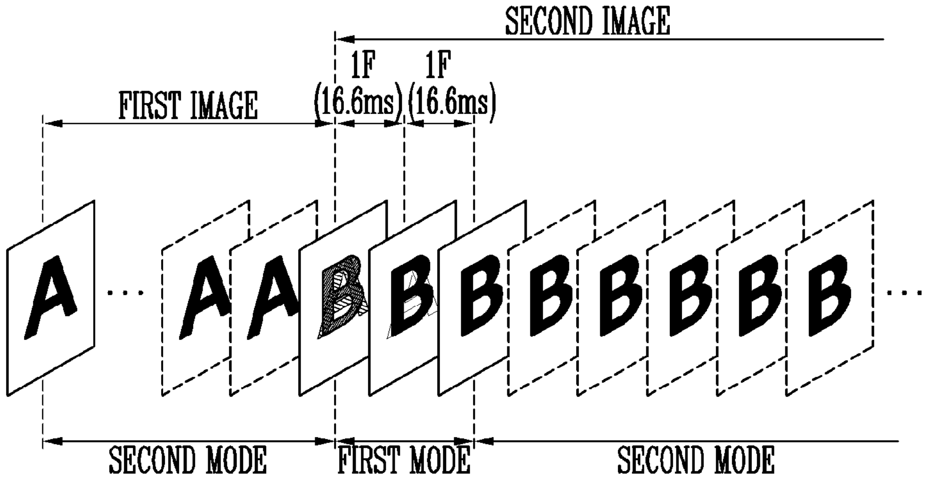

FIGS. 7A and 7B are diagrams illustrating an embodiment of a method for driving the organic light emitting display device when an image displayed in the pixel unit is changed in the second mode.

Referring to FIG. 7A, a first image may be displayed in the second mode. While the first image is being displayed, as described with reference to FIG. 5, the second scan signals G21 to G2n are supplied during the first period T1 of the second unit frame period 1F', and may not be supplied during the second period T2 of the second unit frame period 1F'.

In the second mode, when the image displayed in the organic light emitting display device is changed from the first image to a second image different from the first image, the driving mode of the organic light emitting display device may be changed to the first mode during a predetermined period Ts. In an embodiment, the organic light emitting display device may be driven at the first driving frequency during the predetermined period Ts, and the driving mode of the organic light emitting display device may be then changed to the second mode.

In such an embodiment, as described with reference to FIG. 4, the first scan signals G11 to G1n and the second scan signals G21 to G2n are repeatedly supplied every first unit frame period 1F during the predetermined period Ts.

In such an embodiment, during the predetermined period Ts, the emission control signals F1 to Fn may also be repeatedly supplied during every first unit frame period 1F, and the data signal DS may be supplied to be synchronized with the scan signals G11 to G1n and G21 to G2n.

Then, as described with reference to FIGS. 2 and 3, a voltage corresponding to the data signal DS is stored in each of the pixels PXL. That is, the data signal DS is stored in each of the pixels PXL for every first unit frame period 1F.

Each of the pixels PXL generates light with a predetermined luminance, corresponding to the data signal DS, so that the second image may be displayed in the pixel unit 100.

After the predetermined period Ts elapses, the organic light emitting display device may be again driven at the second driving frequency, such that the second image may be displayed in the second mode.

A period in which the second image is displayed in the first mode may be set shorter than that in which the second image is displayed in the second mode.

The predetermined period Ts may be set to correspond to a plurality of first unit frame period 1F In an embodiment, as shown in FIG. 7A, the predetermined period Ts may be set to correspond to two first unit frame periods 1F, but the disclosure is not limited thereto.

Referring to FIG. 7B, when the first image is changed to the second image in the second mode, the organic light emitting display device may be driven at the first driving frequency during an initial portion (the predetermined period Ts) of the entire period in which the second image is displayed.

When the first image is changed to the second image during the predetermined period Ts, the organic light emitting display device may be set to be driven in the first mode up to a q-th frame and be driven in the second mode from a (q+1)-th frame (here, q is a natural number of 2 or more).

In such an embodiment, as shown in FIG. 7B, a target luminance is implemented from a third frame when the first image is changed to the second image. Hence, the predetermined period Ts may be set such that two initial frames after the change in image are displayed in the first mode and are displayed in the second mode from the third frame.

In an embodiment, as shown in FIG. 7B, the predetermined period Ts may be set to correspond to two first unit frame periods 1F, i.e., 2F.

Accordingly, in such an embodiment, the interval between first and second frames in which the second image is displayed is narrowed, and the interval between the second frame and the third frame is narrowed.

In an embodiment, as shown in FIGS. 6A and 7B, the time for which a previous image overlaps with a current image may be about 2 seconds. In an alternative embodiment, as shown in FIG. 7B, the time for which a previous image overlaps with a current image may be about 33.3 milliseconds (ms).

FIG. 8 is a diagram exemplarily illustrating waveform diagrams of start pulses supplied to the first scan driver and the second scan driver, which are shown in FIG. 1A.

In the first mode, scan signals, in which pulse numbers are equal to each other, are supplied to the first scan lines S11 to S1n and the second scan lines S21 to S2n as shown in FIG. 4. Therefore, as shown in FIG. 8, the number of first start pulses SSP1 supplied from the timing controller 250 to the first scan driver 210*a* and the number of second start pulses SSP2 supplied from the timing controller 250 to the second scan driver 210*b* may be set equal to each other.

In the second mode, the pulse numbers of the scan signals supplied to the first scan lines S11 to S1n and the second scan lines S21 to S2n are different from each other as shown in FIG. 5. Therefore, in the second mode, the number of first start pulses SSP1 supplied from the timing controller 250 to the first scan driver 210*a* and the number of second start pulses SSP2 supplied from the timing controller 250 to the second scan driver 210*b* may be set different from each other.

In one embodiment, for example, in the second mode, h (h is a natural number of 2 or more) first start pulses SSP1 may be supplied to the first scan driver 210*a* during a unit time period, and p (p is a natural number smaller than h) second start pulses SSP2 may be supplied to the second scan driver 210*b* during the unit time period.

Figure 9:
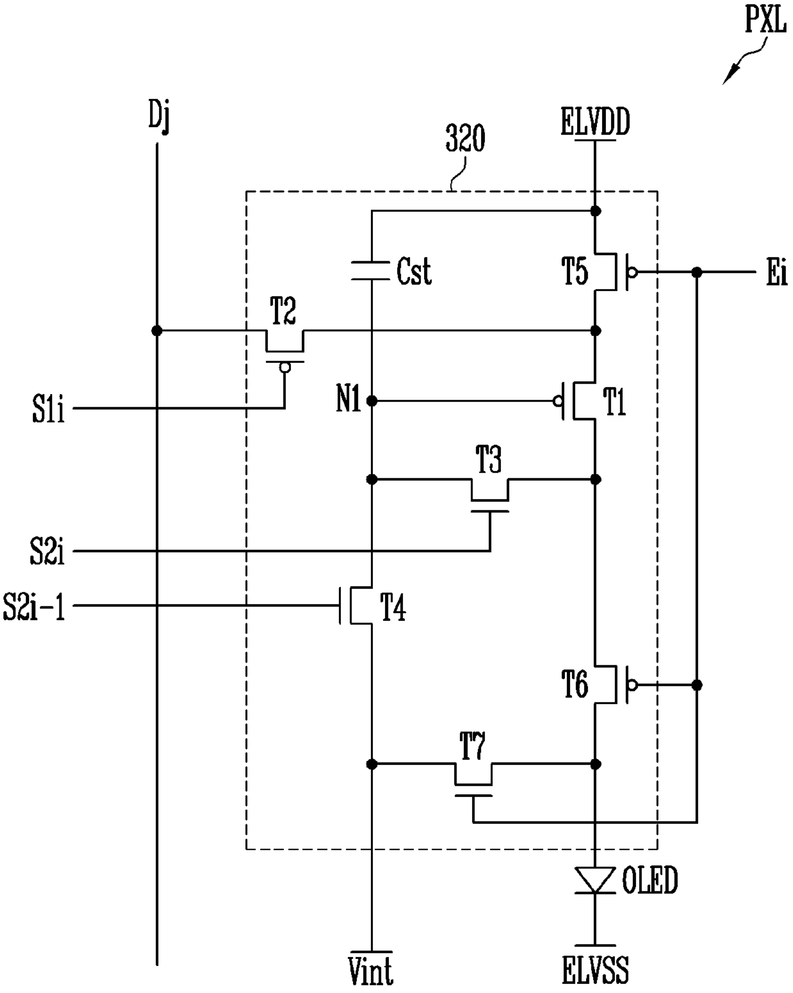
FIG. 9 is a diagram illustrating an alternative embodiment of the pixel shown in FIG. TA.
Figure 10:
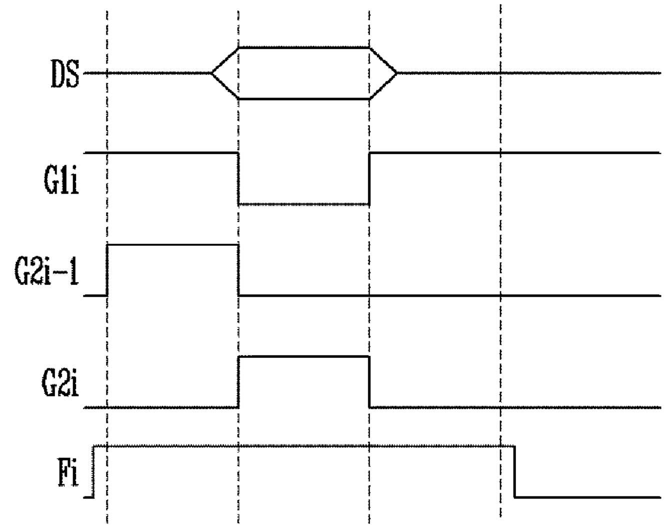
FIG. 10 is a signal timing diagram illustrating an embodiment of a driving method of the pixel shown in FIG. 9.

FIG. 9 is a diagram illustrating an alternative embodiment of the pixel shown in FIG. 1B. FIG. 10 is a signal timing diagram illustrating an embodiment of a driving method of the pixel shown in FIG. 9.

For convenience of illustration and description, a pixel PXL that is located on an i-th horizontal line and is coupled to a j-th data line Dj is illustrated in FIG. 9. The pixel shown in FIG. 9 is substantially the same as the pixel shown in FIG. 1B except for a seventh transistor T7. The same or like elements shown in FIG. 9 have been labeled with the same reference characters as used above to describe the embodiments of the pixel shown in FIG. 1B, and any repetitive detailed description thereof will hereinafter be omitted or simplified.

Referring to FIG. 9, an embodiment of the pixel PXL may include an organic light emitting diode OLED and a pixel circuit 320 for controlling an amount of current supplied to the organic light emitting diode OLED.

The pixel circuit 320 may include first to seventh transistors T1 to T7 and a storage capacitor Cst to control the amount of current supplied to the organic light emitting diode OLED.

In such an embodiment, the seventh transistor T7 may be an N-type transistor. In one embodiment, for example, the seventh transistor T7 may be an N-type oxide semiconductor transistor.

In such an embodiment, a gate electrode of the seventh transistor T7 may be coupled to an i-th emission control line E1. Therefore, when an emission control signal is supplied to the i-th emission control line E1, the pixel PXL is in the non-emission state as the fifth transistor T5 and the sixth transistor T6 are turned off. Simultaneously, the seventh transistor T7 is turned on, and hence an anode electrode of the organic light emitting diode OLED is initialized to the voltage of the initialization power source Vint.

The pixel circuit 320 shown in FIG. 9 may be set identically to the pixel circuit 310 shown in FIG. 1B, except that the seventh transistor T7 is the N-type transistor.

In such an embodiment, the driving method of the pixel circuit 320 is substantially the same as that of the pixel circuit 310 of FIG. 1B, except that a signal (e.g., an emission control signal) having a high-potential (or a high-level) voltage is supplied to the seventh transistor T7 such that the seventh transistor T7 may be turned on, and a turn-on timing of the seventh transistor T7 is prior to that of the fourth transistor T4.

Figure 11:
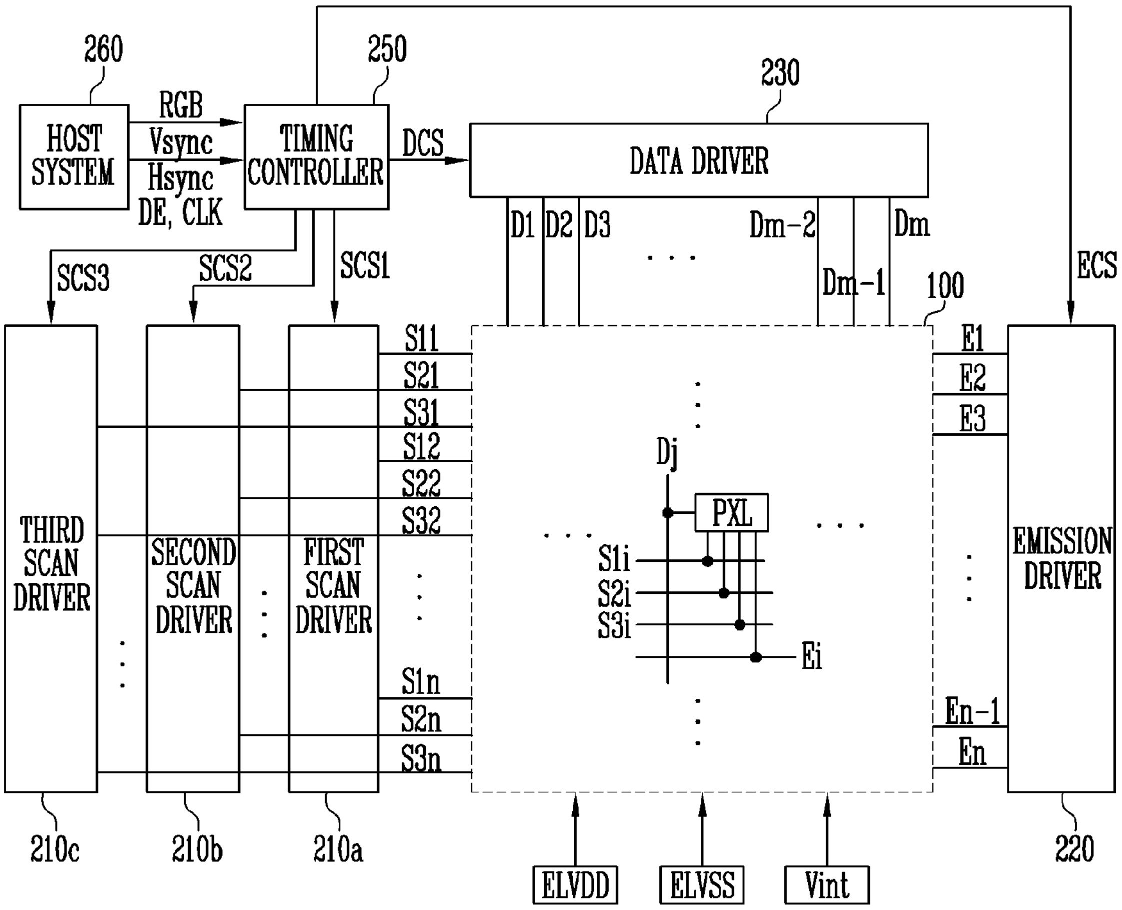
FIG. 11 is a diagram schematically illustrating a configuration of a display device according to an alternative embodiment of the disclosure.

FIG. 11 is a diagram schematically illustrating a configuration of a display device according to an alternative embodiment of the disclosure. The diagram in FIG. 11 is substantially the same as the diagram shown in FIG. TA except for a third scan driver 210*c*. The same or like elements shown in FIG. 11 have been labeled with the same reference characters as used above to describe the embodiments of the display device shown in FIG. TA, and any repetitive detailed description thereof will hereinafter be omitted or simplified.

Referring to FIG. 11, an embodiment of the organic light emitting display device may further include a third scan driver 210*c*.

The timing controller 250 may generate a third scan driving control signal SCS3, based on signals input from the host system 260. The third scan driving control signal SCS3 generated by the timing controller 250 may be supplied to the third scan driver 210*c*.

The third scan driving control signal SCS3 may include a clock signal CLK and a third start pulse.

The third start pulse may control the initial output timing of a third scan signal from the third scan driver 210*c*.

The third scan driver 210*c* may supply a third scan signal to third scan lines S31 to S3n in response to the third scan driving control signal SCS3. In one embodiment, for example, the third scan driver 210*c* may sequentially supply the third scan signal to the third scan lines S31 to S3n.

The third scan signal may be set to a gate-on voltage (e.g., a high-potential or high level voltage) such that transistors (e.g., N-type transistors) included in the pixels PXL may be turned on.

In the first mode and the second mode, the third scan driver 210*c* may repeatedly supply the third scan signal to the third scan lines S31 to S3n for every predetermined period.

The organic light emitting display device shown in FIG. 11 is substantially the same as the organic light emitting device shown in FIG. 1A, except that the third scan driver 210*c* is additionally provided.

Figure 12:
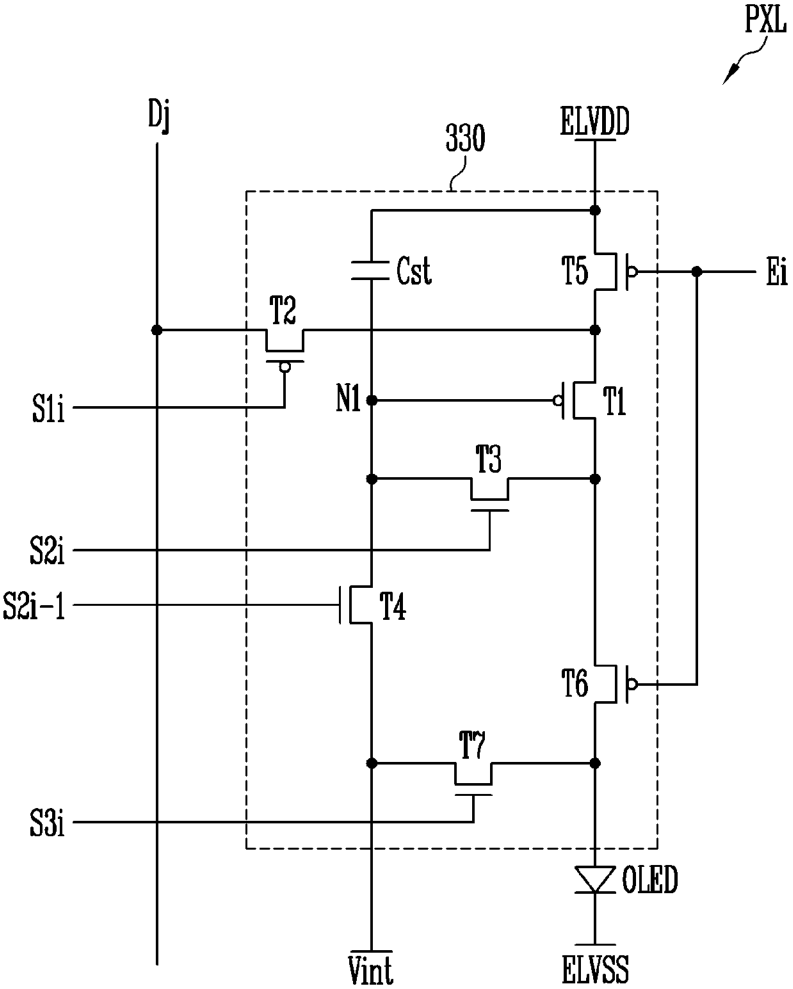
FIG. 12 is a diagram illustrating an embodiment of a pixel shown in FIG. 11.
Figure 13:
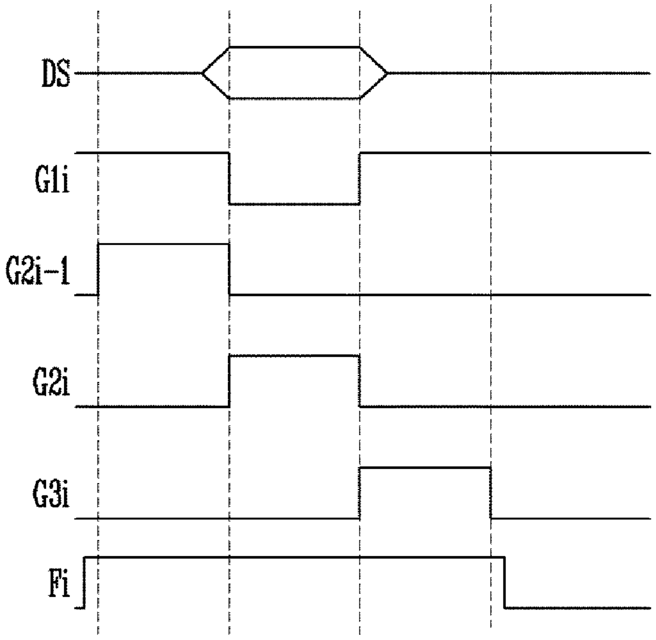
FIG. 13 is a signal timing diagram illustrating an embodiment of a driving method of the pixel shown in FIG. 12.

FIG. 12 is a diagram illustrating an embodiment of the pixel shown in FIG. 11. FIG. 13 is a signal timing diagram illustrating an embodiment of a driving method of the pixel shown in FIG. 12.

For convenience of illustration and description, a pixel PXL that is located on an i-th horizontal line and is coupled to a j-th data line Dj is illustrated in FIG. 12. For convenience of description, any repetitive detailed description of the same or like elements in FIG. 12 described above with reference to FIG. 1B will be omitted or simplified.

Referring to FIG. 12, an embodiment of the pixel PXL may include an organic light emitting diode OLED and a pixel circuit 330 for controlling an amount of current supplied to the organic light emitting diode OLED.

The pixel circuit 330 may include first to seventh transistors T1 to T7 and a storage capacitor Cst to control the amount of current supplied to the organic light emitting diode OLED.

The seventh transistor T7 may be an N-type transistor. In one embodiment, for example, the seventh transistor T7 may be an N-type oxide semiconductor transistor. In such an embodiment, a gate electrode of the seventh transistor T7 may be coupled to an i-th third scan line S3i.

The pixel circuit 330 shown in FIG. 12 may be substantially the same as the pixel circuit 310 shown in FIG. 1B, except that the seventh transistor T7 is the N-type transistor.

In such an embodiment, the driving method of the pixel circuit 330 is substantially the same as that of the pixel circuit 310 of FIG. 2, except that a signal (e.g., an emission control signal) having a high-potential (or a high-level) voltage is supplied to the seventh transistor T7 such that the seventh transistor T7 may be turned on.

Figure 14:
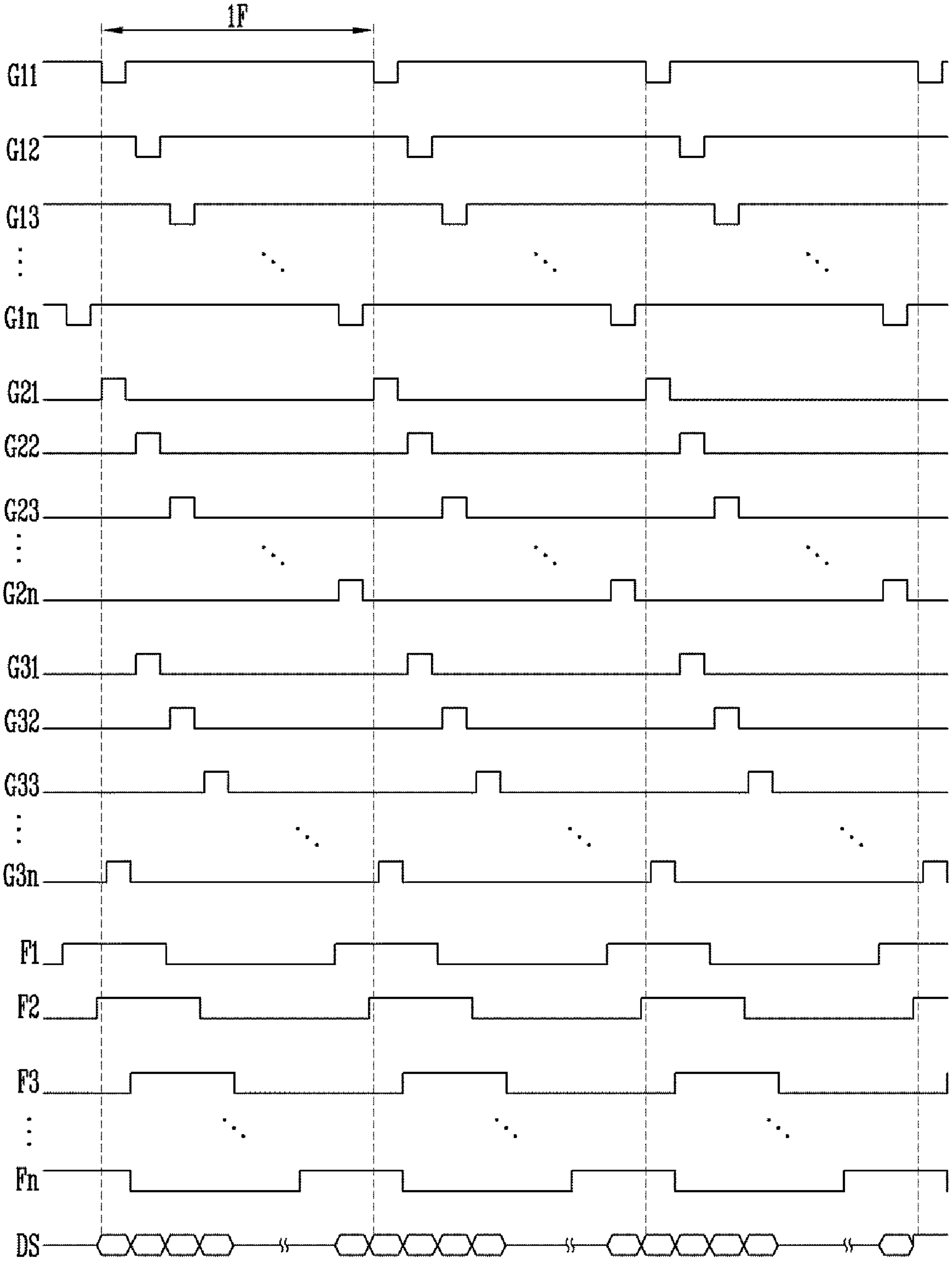
FIGS. 14 to 16 are signal timing diagrams illustrating an embodiment of a method for driving the organic light emitting display device shown in FIG. 11.

FIG. 14 is a signal timing diagram illustrating an embodiment of a method for driving the organic light emitting display device shown in FIG. 11 in the first mode.

The signal timing diagram in FIG. 14 is substantially the same as the signal timing diagram shown in FIG. 4 except for third scan signals G31 to G3n. The same or like elements shown in FIG. 14 have been labeled with the same reference characters as used above to describe the embodiments of the method for driving the organic light emitting display device shown in FIG. 4, and any repetitive detailed description thereof will hereinafter be omitted or simplified.

Referring to FIG. 14, in the first mode, during a first unit frame period 1F, first scan signals G11 to G1n may be sequentially supplied, second scan signals G21 to G2n may be sequentially supplied, and third scan signals G31 to G3n may be sequentially supplied.

The first scan signals G11 to Gin, the second scan signals G21 to G2n, and the third scan signals G31 to G3n may be repeatedly supplied during every first unit frame period 1F.

The first scan signals G11 to G1n supplied to gate electrodes of P-type transistors may be set to a low-potential (or low-level) voltage. In such an embodiment, the second scan signals G21 to G2n and the third scan signals G31 to G3n, which are supplied to N-type transistors, may be set to a high-potential (or high-level) voltage.

Here, an i-th third scan signal G3i may overlap with an (i+1)-th first scan signal G11+1 and an (i+1)-th second scan signal G2i+1.

Emission control signals F1 to Fn may be sequentially supplied during the first unit frame period 1F. The emission control signals F1 to Fn may be repeatedly supplied during every first unit frame period 1F.

A data signal DS may be supplied to be synchronized with the scan signals G11 to G1n and G21 to G2n. Then, a voltage corresponding to the data signal DS is stored in the pixels PXL. That is, the data signal DS is stored in the pixels PXL for every unit frame period.

Each of the pixels PXL generates light with a predetermined luminance corresponding to the data signal DS, so that a predetermined image can be displayed in the pixel unit 100.

Figure 15:
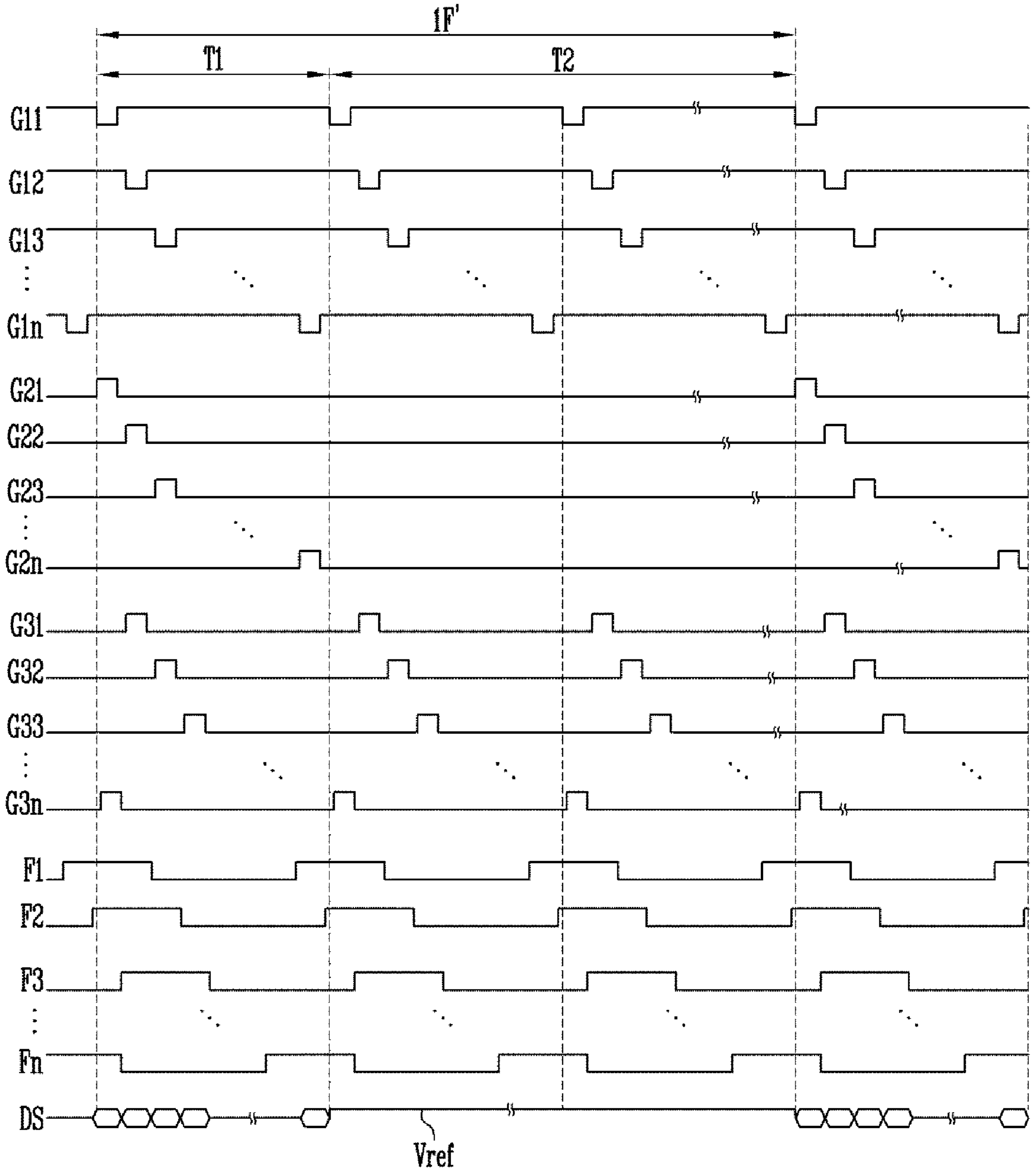

FIG. 15 is a signal timing diagram illustrating an embodiment of a method for driving the organic light emitting display device shown in FIG. 11 in the second mode.

The signal timing diagram in FIG. 15 is substantially the same as the signal timing diagram shown in FIG. 5 except for third scan signals G31 to G3n. The same or like elements shown in FIG. 15 have been labeled with the same reference characters as used above to describe the embodiments of the method for driving the organic light emitting display device shown in FIG. 5, and any repetitive detailed description thereof will hereinafter be omitted or simplified.

Referring to FIG. 15, a second unit frame period 1F' may include a first period T1 and a second period T2.

During the first period T1, the first scan signals G11 to G1n may be sequentially supplied, the second scan signals G21 to G2n may be sequentially supplied, and the third scan signals G31 to G3n may be sequentially supplied.

In such an embodiment, during the first period T1, the emission control signals F1 to Fn may be sequentially supplied, and the data signal DS may be supplied to be synchronized with the scan signals G11 to G1n and G21 to G2n.

During the second period T2, the first scan signals G11 to G1n may be sequentially supplied, and the third scan signals G31 to G3n may be sequentially supplied. Here, the first scan signals G11 to G1n and the third scan signals G31 to G3n may be repeatedly supplied during every first unit frame period 1F.

During the second period T2, the second scan signals G21 to G2n may not be supplied.

Also, during the second period T2, the emission control signals F1 to Fn may be repeatedly supplied in a predetermined period, and the voltage of a reference power source Vref may be supplied to the data lines D1 to Dm.

While the same image is being displayed in the second mode, the second unit frame period 1F' including the first period T1 and the second period T2 may be repeated.

Figure 16:
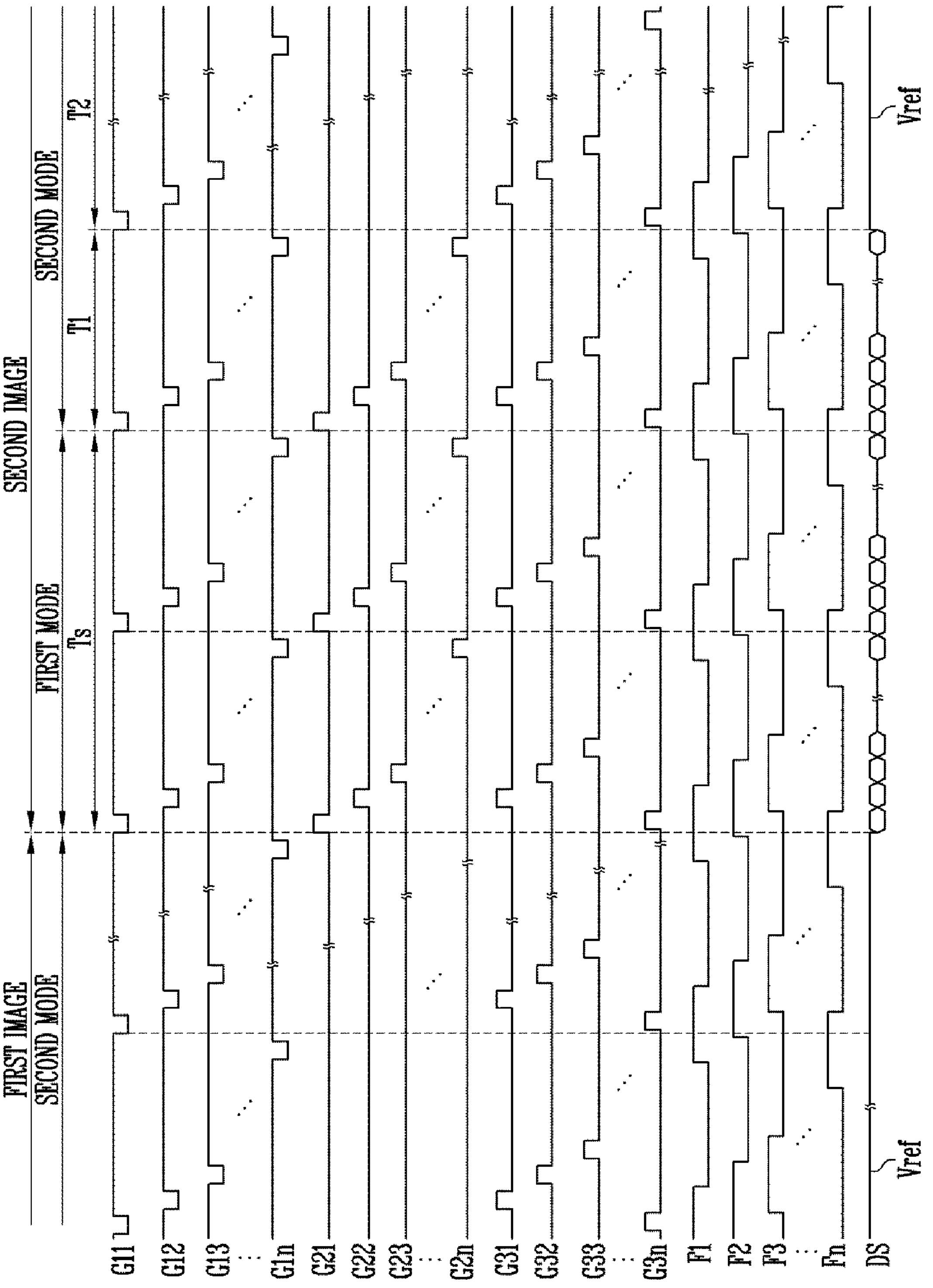

FIG. 16 is a signal timing diagram illustrating an embodiment of a method for driving the organic light emitting diode when an image displayed in the pixel unit is changed in the second mode.

The signal timing diagram in FIG. 16 is substantially the same as the signal timing diagram shown in FIG. 7A except for third scan signals G31 to G3n. The same or like elements shown in FIG. 16 have been labeled with the same reference characters as used above to describe the embodiments of the method for driving the organic light emitting display device shown in FIG. 7A, and any repetitive detailed description thereof will hereinafter be omitted or simplified.

Referring to FIG. 16, a first image may be displayed in the second mode.

Subsequently, the first image may be changed to a second image. In such an embodiment, the organic light emitting display device may be driven at a first driving frequency during an initial portion of the period in which the second image is displayed. The organic light emitting display device may be driven at a second driving frequency during the remaining portion of the period.

In such an embodiment, the second image may be displayed in the first mode during a portion of the period, and be displayed in the second mode during the remaining portion of the period.

During the portion of the period, the first scan signals G11 to G1n, the second scan signals G21 to G2n, and the third scan signals G31 to G3n may be repeatedly supplied during every first unit frame period 1F.

Subsequently, the organic light emitting display device may be again driven at the second driving frequency. That is, the second image may be displayed in the second mode.

According to embodiments of the disclosure, an organic light emitting display device may have improved display quality.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A light emitting display device comprising:
- pixels;
- a controller to drive the pixels according to an input image stream in a plurality of driving frequencies;
- a first scan driver which supplies a first scan signal to first scan lines in response to a first scan driving control signal from the controller; and a second scan driver which supplies a second scan signal to second scan lines in response to a second scan driving control signal from the controller, wherein at least one of the pixels comprises:
  - a first transistor having a gate electrode coupled to a first node and coupled between a second node and a third node, the second node coupled to a first power source;
  - a light emitting diode having an anode electrode coupled to the third node and a cathode electrode coupled to a second power source node;
  - a second transistor coupled between a data line and the second node, and having a gate electrode coupled to one of the first scan lines;
  - a storage capacitor coupled between the first power source and the first node;
  - a third transistor coupled between the first node and the third node, and having a gate electrode coupled to one of the second scan lines that is different from the one of the first scan lines;
  - a fourth transistor coupled between the first node and an initialization power source, and having a gate electrode coupled to another one of the second scan lines; and
  - a seventh transistor coupled between the initialization power source and the anode electrode of the light emitting diode, and having a gate electrode coupled to a signal line different from the another one of the second scan lines, and
  - wherein the first and second transistors are poly-silicon semiconductor transistors, and the third, fourth, and seventh transistors are oxide semiconductor transistors, and
  - wherein the first scan signal applied to the gate electrode of the second transistor through the one of the first scan lines is different from the second scan signal applied to the gate electrode of the third transistor through the one of the second scan lines.

2. The light emitting display device of claim 1, wherein:
- at least one of the pixels further comprises:
  - a fifth transistor coupled between the first power source and the second node; and
  - a sixth transistor coupled between the third node and the anode electrode of the light emitting diode; and
  - at least one of the fifth and sixth transistors has a gate electrode coupled to an emission control line, and
  - wherein the signal line coupled to the gate electrode of the seventh transistor is the emission control line.

3. The light emitting display device of claim 2, wherein both the gate electrodes of the fifth and sixth transistors are coupled to the emission control line.

4. The light emitting display device of claim 1, wherein, when the pixels are driven in a first driving frequency of the plurality of driving frequencies, the controller is configured to, in response to a transition of the input image stream from a first image to a second image, drive the pixels in a second driving frequency of the plurality of driving frequencies to display the second image before the pixels are driven in the first driving frequency to display the second image.

5. The light emitting display device of claim 4, wherein the controller is configured to drive the pixels in the first frequency to display the first image.

6. The light emitting display device of claim 4, wherein in response to the transition of the input image stream from the first image to the second image, the controller is configured to:
- driving the pixels in the second frequency to display the second image during a first period; and driving the pixels in the first frequency to display the second image during a second period immediately after the first period.

7. The light emitting display device of claim 6, wherein the first period is an initial portion of the entire display period of the second image.

8. The light emitting display device of claim 6, wherein the controller is configured to drive the pixels to display one or more first frames in the second driving frequency during the first period, one or more first frames corresponding to the second image.

9. The light emitting display device of claim 8, wherein the controller is configured to drive the pixels to display one or more second frames in the first driving frequency during the second period, one or more second frames corresponding to the second image.

10. The light emitting display device of claim 4, wherein the second driving frequency is higher than the first driving frequency.

11. The light emitting display device of claim 4, wherein the input image stream comprises a first input image having the first image and a second input image having the second image, the second input image following the first input image.

12. The light emitting display device of claim 4, wherein the second image is different from the first image.

13. The light emitting display device of claim 4, wherein each of the first image and the second image is a static image.

* * * * *